(12) United States Patent
Matsumoto

(10) Patent No.: US 7,817,877 B2
(45) Date of Patent: Oct. 19, 2010

(54) IMAGE FUSION PROCESSING METHOD, PROCESSING PROGRAM, AND PROCESSING DEVICE

(75) Inventor: Kazuhiko Matsumoto, Tokyo (JP)

(73) Assignee: Ziosoft Inc., Tokyo (JP)

( * ) Notice: Subject to any disclaimer, the term of this patent is extended or adjusted under 35 U.S.C. 154(b) by 1059 days.

(21) Appl. No.: 11/484,059

(22) Filed: Jul. 10, 2006

(65) Prior Publication Data

US 2007/0098299 A1    May 3, 2007

(30) Foreign Application Priority Data

Jul. 11, 2005    (JP)    ............................. 2005-202313

(51) Int. Cl.
*G06K 9/36*    (2006.01)
(52) U.S. Cl. ..................... 382/284; 382/154
(58) Field of Classification Search ................ 382/284, 382/154; 345/505, 419, 501; 718/100–106, 718/203
See application file for complete search history.

(56) References Cited

U.S. PATENT DOCUMENTS

| | | | | |
|---|---|---|---|---|
| 5,381,518 A | * | 1/1995 | Drebin et al. ............... | 345/424 |
| 5,839,440 A | * | 11/1998 | Liou et al. .................. | 600/431 |
| 5,995,108 A | | 11/1999 | Isobe et al. | |
| 6,639,595 B1 | * | 10/2003 | Drebin et al. ............... | 345/426 |
| 7,415,166 B2 | * | 8/2008 | Kubota ....................... | 382/284 |
| 2005/0195206 A1 | * | 9/2005 | Wogsberg ................... | 345/547 |

FOREIGN PATENT DOCUMENTS

| | | | |
|---|---|---|---|
| JP | 04-183446 | | 6/1992 |
| JP | 2001-291091 | | 10/2001 |
| JP | 2003-036448 | * | 2/2003 |
| JP | 2003036448 A | * | 2/2003 |
| JP | 2003-157444 | | 5/2003 |
| JP | 2003-233600 | | 8/2003 |
| JP | 2004-215846 | | 8/2004 |
| WO | WO 03/077202 | | 9/2003 |

OTHER PUBLICATIONS

Philippe G. Lacroute, "Fast Volume Rendering Using a Shear-Warp Factorization of the Viewing Transformation", Technical Report: CSL-TR-95-678, Sep. 1995, pp. i, v-xiii, and 1-126.*
Maria Ferre, et al., "A framework for fusion methods and rendering techniques of multimodal volume data", Computer Animation and Virtual Worlds, 2004, pp. 63-77.

* cited by examiner

*Primary Examiner*—Brian Q Le
*Assistant Examiner*—Mekonen Bekele
(74) *Attorney, Agent, or Firm*—Sawyer Law Group, P.C.

(57) ABSTRACT

An image fusion processing method, image fusion processing program, and image fusion processing device for fusing a plurality of images of three or more dimensions obtained from a single watched object without degenerating the amount of information. A CPU calculates an optical parameter corresponding to a first voxel value and an optical parameter corresponding to a second voxel value. Then, the CPU calculates synthesized optical parameters based on a synthesis ratio obtained through a synthesis ratio determining process performed at each current position and updates the residual light and reflected light using these optical parameters. When the current position is an end point, a CPU sets the reflected light as a pixel value, and the fusion image data generating process ends for the single pixel configuring a frame.

18 Claims, 13 Drawing Sheets

Fusion image

IMAGE FUSION PROCESSING METHOD, PROCESSING PROGRAM, AND PROCESSING DEVICE

CROSS-REFERENCE OF RELATED APPLICATIONS

This application claims benefit under 35 USC 119 of Japan Application No. 2005-202313, filed Jul. 11, 2005.

BACKGROUND OF THE INVENTION

The present invention relates to an image fusion processing method, image fusion processing program, and image fusion processing device. More specifically, the present invention relates to an image fusion processing method, image fusion processing program, and image fusion processing device for fusing a plurality of images of three or more dimensions obtained from a single watched object without degenerating the amount of information.

Heretofore, diagnosis in the medical field has been accomplished through the aid of imaging a single watched object, such as an organ in a human body, using a plurality of different modalities, including computerized tomography (CT) imaging devices, positron emission tomography (PET) imaging devices and the like, and fusing the plurality of images obtained by these plurality of imaging apparatuses so as to use the fusion image for diagnosis. For example, the sizes and positional relationships of lesions can be precisely recognized by fusing a high resolution CT image and a PET image showing organ function information.

FIG. 1 shows one conventional process for fusing a plurality of such images. In the process of FIG. 1, a plurality of volume data (CT image 101, PET image 103) separately undergo rendering, then the respective images 105 and 107 are fused at a fixed ratio to generate a fusion image 109. However, since a plurality of images are synthesized two-dimensionally in this process, the contours accurately represented in the CT image and the color of the watched object in the fusion image 109 are both blurred.

FIG. 2 shows another conventional process for fusing a plurality of images. In the process of FIG. 2, a plurality of voxel values are synthesized for each predetermined sampling point. Then, the synthesized voxel value 111 is rendered to generate a fusion image 113 (refer to, for example, Maria Ferre, Anna Puig, Dani Tost, "A framework for fusion methods and rendering techniques of multimodal volume data", Journal of Visualization and Computer Animation 15(2): 63-77 (2004)). The thus obtained fusion image 113 is sharp, and the anterior-posterior relationship is accurately represented.

However, since a plurality of voxel values are synthesized prior to rendering in this image fusion process, all of the optical parameters obtained from volume data, such as opacity, shading coefficient, color and the like, are dependent on the synthesized voxel value. Therefore, the multi-dimensional information included in the plurality of volume data degenerates in one dimensional information in the synthesized voxel value. That is, the representation of the fused image is limited since the optical parameters of either the CT image or PET image are used for the rendering. Especially, the fusion image is unnatural when the CT image and the PET image have different resolutions.

SUMMARY OF THE INVENTION

Accordingly, the present invention provides an image fusion processing method, image fusion processing program, and image fusion processing device for fusing a plurality of images of three or more dimension dimensions obtained from a single watched object without degenerating the amount of information.

One aspect of the present invention is a method for generating a fusion image by fusing plural pieces of image data for three or more dimensions obtained from a single watched object through individual processing or distributed processing executed by at least one computer. The method includes associating the plural pieces of image data for three or more dimensions with one another based on positional relationship and projecting a plurality of virtual rays for each of the plural pieces of image data for three or more dimensions. The plural pieces of image data for three or more dimensions each includes optical parameters for sampling positions on the corresponding plurality of virtual rays. The method further includes determining a synthesis ratio at least twice for synthesizing the optical parameters of the plural pieces of image data for three or more dimensions with one another on each of the virtual rays, calculating a synthesized optical parameter for each of the sampling positions by synthesizing the optical parameters of the plural pieces of image data for three or more dimensions based on the synthesis ratio, calculating partially reflected light at each of the sampling positions based on the synthesized optical parameter, and calculating a pixel value of the fusion image by accumulating the partially reflected light.

Another aspect of the present invention is a computer program device incorporating a computer readable medium encoded with a program for generating a fusion image by fusing plural pieces of image data for three or more dimensions obtained from a single watched object through individual processing or distributed processing executed by at least one computer. The program when executed by the at least one computer causing the at least one computer to perform associating the plural pieces of image data for three or more dimensions with one another based on positional relationship and projecting a plurality of virtual rays for each of the plural pieces of image data for three or more dimensions. The plural pieces of image data for three or more dimensions each includes optical parameters for sampling positions on the corresponding plurality of virtual rays. Further, the program when executed by the at least one computer causing the at least one computer to perform determining a synthesis ratio at least twice for synthesizing the optical parameters of the plural pieces of image data for three or more dimensions with one another on each of the virtual rays, calculating a synthesized optical parameter for each of the sampling positions by synthesizing the optical parameters of the plural pieces of image data for three or more dimensions based on the synthesis ratio, calculating partially reflected light at each of the sampling positions based on the synthesized optical parameter, and calculating a pixel value of the fusion image by accumulating the partially reflected light.

A further aspect of the present invention is an apparatus for generating a fusion image by fusing plural pieces of image data for three or more dimensions obtained from a single watched object through individual processing or distributed processing executed by at least one computer. The apparatus includes means for associating the plural pieces of image data for three or more dimensions with one another based on positional relationship and projecting a plurality of virtual rays for each of the plural pieces of image data for three or more dimensions. The plural pieces of image data for three or more dimensions each includes optical parameters for sampling positions on the corresponding plurality of virtual rays. The apparatus further includes means for determining a synthesis ratio at least twice for synthesizing the optical parameters of the plural pieces of image data for three or more dimensions with one another on each of the virtual rays, means for calculating a synthesized optical parameter for each of the sampling positions by synthesizing the optical parameters of the plural pieces of image data for three or more dimensions based on the synthesis ratio, means for calculating partially reflected light at each of the sampling positions based on the synthesized optical parameter, and means for calculating a pixel value of the fusion image by accumulating the partially reflected light.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
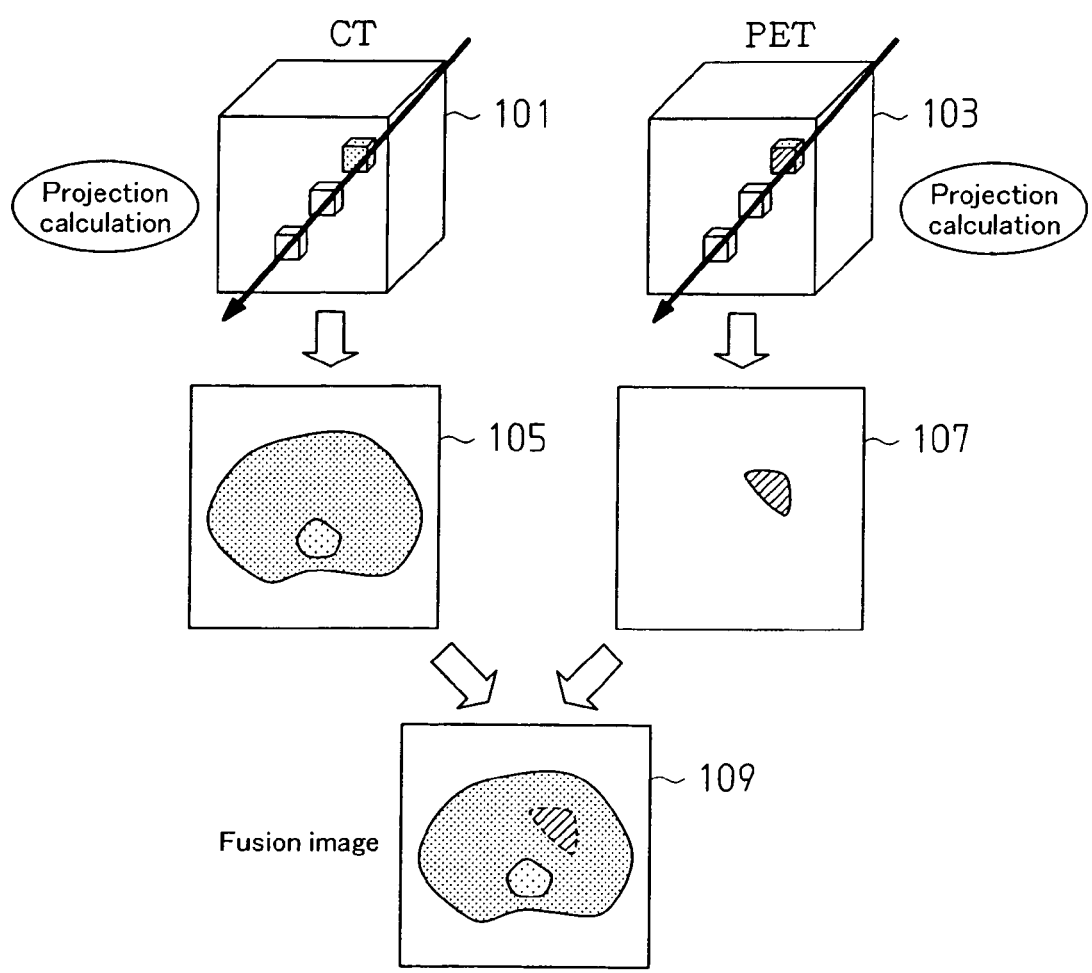
FIG. 1 is a block diagram illustrating a conventional image fusion process.
Figure 2:
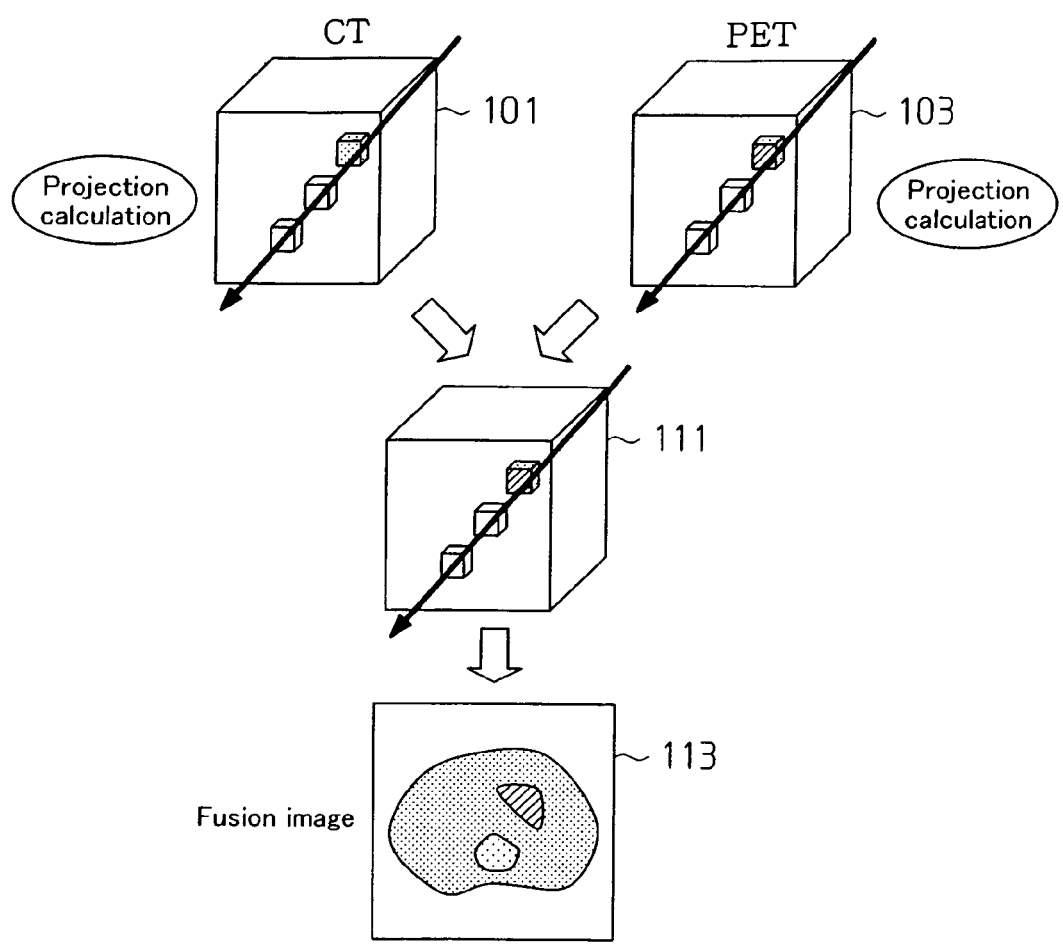
FIG. 2 is a block diagram illustrating another conventional image fusion process.

In the drawings, like numeral are used for like elements throughout.

First Embodiment

An image display device 1 of a first embodiment of the present invention will now be discussed with reference to FIGS. 3 through 12.

Figure 3:
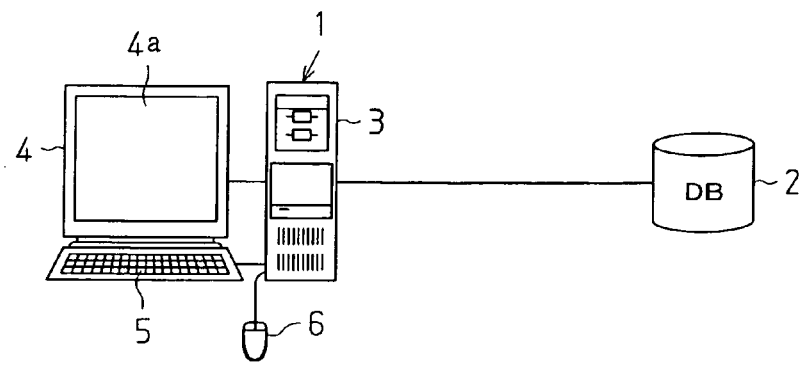
FIG. 3 is a schematic diagram illustrating an image display device according to a first embodiment of the present invention.

As shown in FIG. 3, the image display device 1 reads, for example, CT image data obtained by a CT imaging device and PET image data obtained from a PET imaging device from a database 2, and generates and displays a medical diagnostic image. Although the first embodiment is described by way of example of CT image data and PET image data, the present invention is not limited to such image data. For example, the image data used is not limited to CT image data and PET image data inasmuch as image data obtained medical image processing devices such as magnetic resonance imaging (MRI), magnetic resonance angiography (MRA), combinations of such image data, and processed forms of such image data may also be used. The image display device 1 is provided with a computer 3 (computer, workstation, personal computer), monitor 4, and input device including a keyboard 5 and mouse 6. The computer 3 is connected to a database 2.

Figure 4:
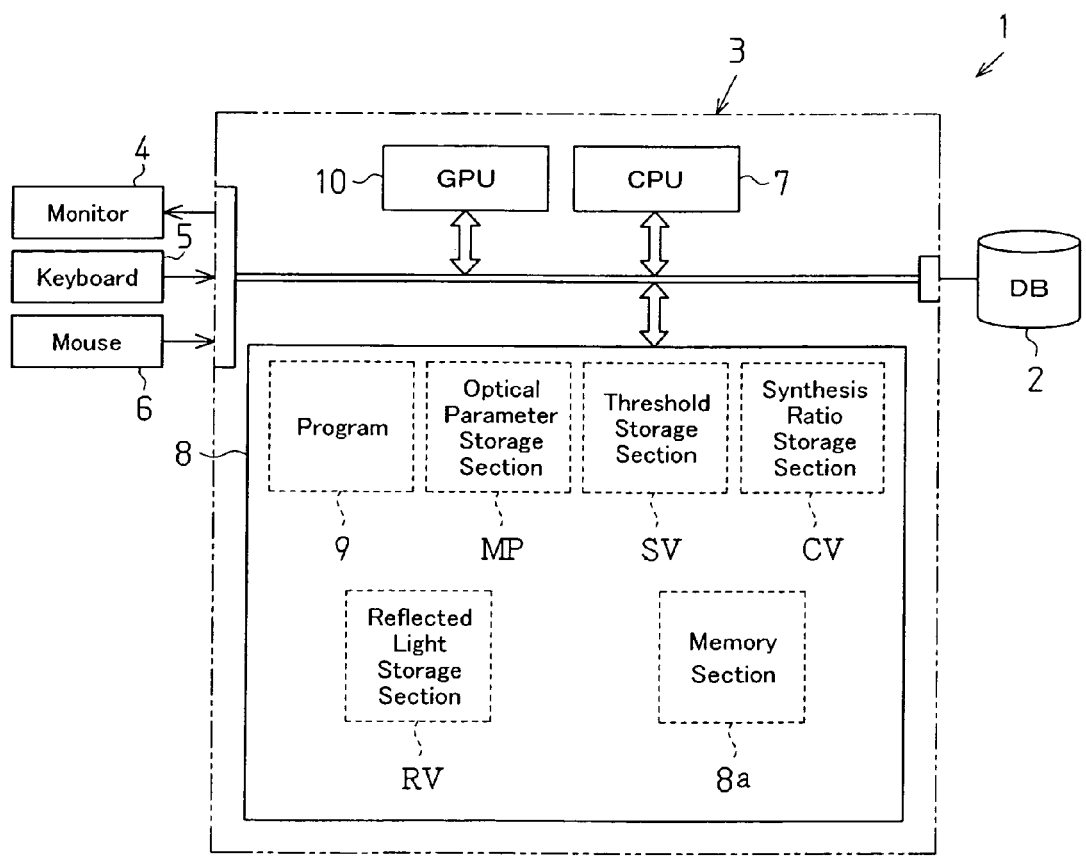
FIG. 4 is a schematic block diagram of the image display device of the first embodiment of the present invention.

FIG. 4 schematically shows the structure of the image display device 1. The computer 3 is provided with a central processing unit (CPU) 7, and memory 8 configured by a hard drive. The memory 8 stores a program (application software) 9 for executing the image fusion process. The memory 8 is provided with a memory section 8a for temporarily storing first voxel data VD1, which is obtained from CT image data, and second voxel data VD2, which is obtained from PET image data, read from the database 2 or hard drive. The memory section 8a temporarily stores projection start points O1 and O2, sampling intervals S1 and S2, current positions X1n and X2n as sampling positions, and end points.

The memory 8 is provided with an optical parameter storage section MP for storing optical parameters P, which is information respectively obtained from the voxel values related to the first voxel data VD1 and second voxel data VD2, for example, watched object shape, tissue information, and tissue contours. The memory 8 is provided with a threshold storage section SV for storing a threshold, employed to determine which one of the optical parameters P of voxel values related to the first voxel data VD1 and second voxel data VD2 is used. The memory 8 is provided with a synthesis ratio storage section CV for storing synthesis ratios, which are for synthesizing the optical parameters P of the voxel values related to the first voxel data VD1 and second voxel data VD2. Furthermore, the memory 8 is provided with a reflected light memory section RV for storing the reflected light of virtual rays respectively irradiating to the first voxel data VD1 and second voxel data VD2 that are respectively reflected by each voxel related to the first voxel data VD1 and second voxel data VD2.

Figure 5:
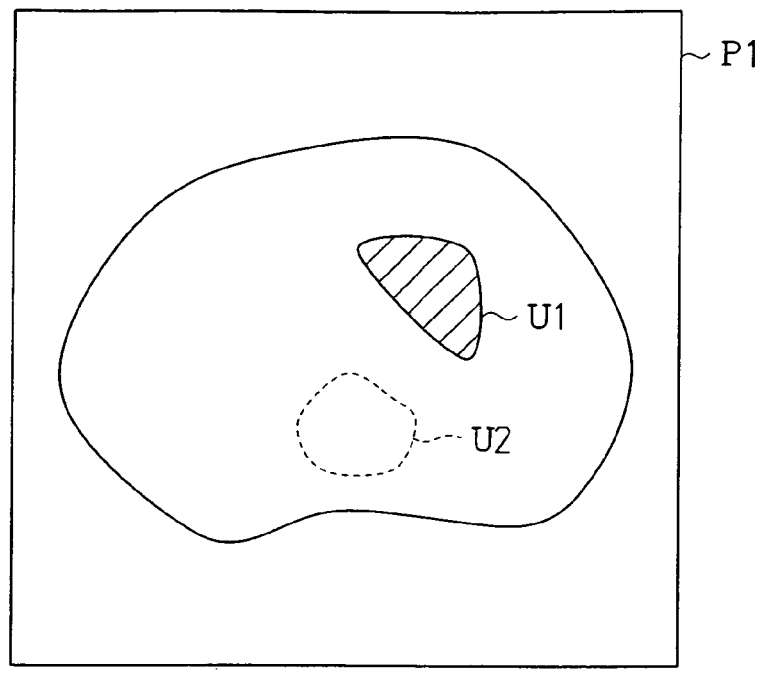
FIG. 5 is a schematic diagram illustrating a fusion image of the first embodiment of the present invention.

The CPU 7 executes the image fusion process for fusing images obtained by a plurality of modalities using the first voxel data VD1 and second voxel data VD2 obtained from CT image data and PET image data read from the database 2 by executing the program 9. That is, in the first embodiment, the CPU 7 (computer 3) executes the image fusion process program of the image fusion process (synthesis ratio determining stage, synthesis optical parameter calculating stage, partially reflected light calculating stage, pixel value calculating stage, color synthesis ratio determining stage, opacity synthesis ratio determining stage, synthesis color information calculating stage, synthesis opacity information calculating stage, shading synthesis ratio determining stage, synthesis shading coefficient calculating stage, voxel value and first threshold comparing stage, voxel value and second threshold comparing stage). Thus, the computer 3 functions as a synthesis ratio determining means, synthesis optical parameter calculating means, partially reflected light calculating means, pixel value calculating means, color synthesis ratio determining means, opacity synthesis ratio determining means, synthesis color information calculating means, synthesis opacity information calculating means, shading synthesis ratio determining means, synthesis shading coefficient calculating means, voxel value and first threshold comparing means, voxel value and second threshold comparing means. The monitor 4 (screen 4a) displays the fusion image P1 which is the result image after the image fusion process has been executed, as shown in FIG. 5.

Figure 6:
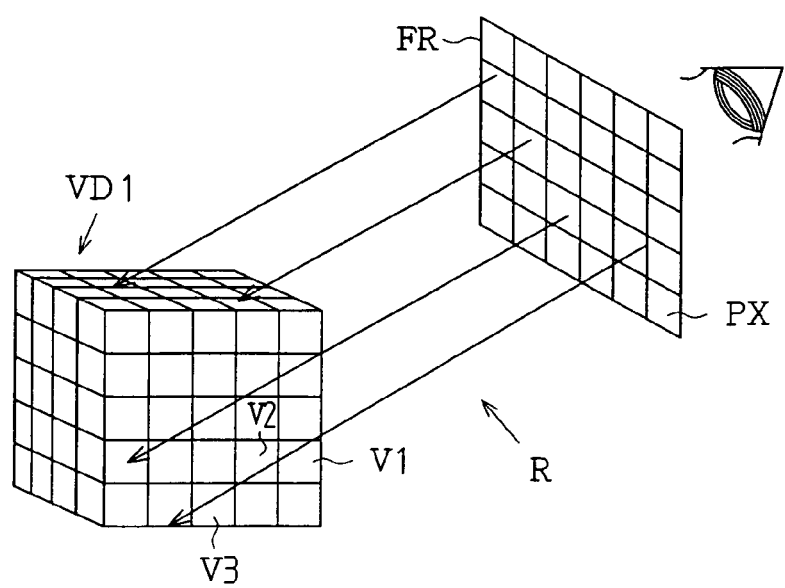
FIG. 6 is an explanatory diagram illustrating the volume rendering process.

The first voxel data VD1 and second voxel data VD2 are voxel sets of image data of three or more dimensions (volume data), as shown in FIG. 6, and are equivalent to density values of voxel values at three-dimensional grid points. In the first embodiment, for example, since the first voxel data VD1 and second voxel data VD2 are data for the same region (lungs) of the same patient imaged by different modalities, the second voxel data VD2 has the same reference number as the first voxel data VD1, and detailed description of the second voxel data VD2 is omitted. In the fist embodiment, the density value of the first voxel data VD1 is the voxel value of the CT image data, that is, the CT value. Similarly, the density value of the second voxel data VD2 is the voxel value of the PET image data, that is, the PET value.

The CT image data is image data of the cross-sectional image of the body of the patient. One slice of CT image data is a two-dimensional cross-sectional image of a watched object, such as bone, blood vessel, or organ. However, the data in its entirety is three-dimensional image data since the obtained image pertains to a plurality of adjacent slices (cross-sectional). Therefore, CT image data refers to three-dimensional image data including a plurality of slices.

CT image data has CT values that differ for each tissue bone, vessel, and organ of the imaged body. CT values are X-ray attenuation coefficients of tissue represented by using water as a reference. The type of tissue and lesion can be determined by the CT value. CT image data includes all coordinate data of the cross-sectional image (slice image) of the body subjected to CT scanning by the CT imaging device. The positional relationship between different tissues in the depth direction can be determined by the coordinate data. That is, the first voxel data VD1 provide CT values (hereinafter, referred to as first voxel value $D1n$ as a voxel value) and coordinate data.

PET image data is slice image data of the body of a patient administered a radioactive drug marked by a radioactive isotope that emits positrons. One slice of PET image data is a two-dimensional cross-sectional image of a watched object, such as an organ. However, the data in its entirety is three-dimensional image data since the obtained image pertains to a plurality of adjacent slices (cross-sectional). Therefore, PET image data refers to three-dimensional image data including a plurality of slices.

PET image data has PET values that differ for each function information (existence of abnormal parts) of an organ. The PET value is the degree of integration of the radioactive drug. Physiological and chemical functions, such as the blood flow of an organ and metabolism, can be determined by the PET value. PET image data includes all coordinate data of the slice image of the body subjected to PET scanning by the PET imaging device. The positional relationship between different tissues in the depth direction can be determined by the coordinate data. That is, the second voxel data VD2 includes PET values (hereinafter, referred to as second voxel value $D2n$ as a voxel value) and coordinate data.

The fusion image P1 is an image of reflected light on a two-dimensional plane when optical parameters P included in the first voxel data VD1 and the second voxel data VD2 have been synthesized at a synthesis ratio determined for each sampling intervals set beforehand. In the first embodiment, the fusion image P1 is generated by a volume rendering process.

The volume rendering process is first described below. Ray casting methods are generally used in volume rendering. Ray casting methods irradiate light rays (virtual rays R) from a pixel PX on a frame FR side while considering the optical path from the observation side (frame FR side), and calculate the reflected light at each position at constant distance, as shown in FIG. 6 (reference symbols "..., V1, V2, V3,..." corresponds to a voxel at each position).

When a single virtual ray R irradiates voxel data along the direction of projection, the virtual ray R impinges the first voxel data VD1, whereupon part of the light is reflected and sequentially passes through the voxels configuring the first voxel data VD1. Then, the absorption and reflection of light at each voxel is discretely calculated, and the pixel value (image element value) of the image projected on the frame FR is determined by the calculation of the reflected light, thus generating a two-dimensional image.

Figure 7:
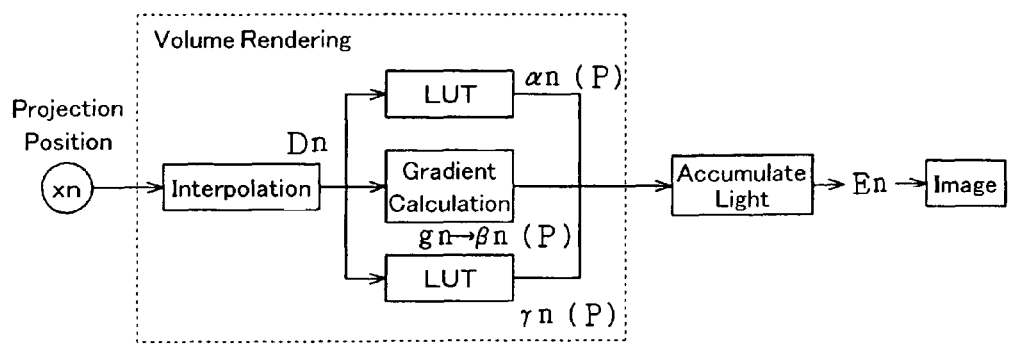
FIG. 7 is a block diagram illustrating the volume rendering process for a single image.

FIG. 7 is a block diagram illustrating the volume rendering process for a single image. In FIG. 7, when a projection position Xn (current position of the virtual ray position) is not placed on a grid, first, an interpolation process is performed from the voxel values of the voxels circumscribing the projection position Xn (current position of the virtual ray position), and a voxel value Dn is calculated at that position. Next, the characteristics parameter of light (hereinafter referred to as optical parameter P) is determined.

The optical parameter P is information representing the independent optical characteristics such as the opacity $\alpha n$ as opacity information, shading coefficient $\beta n$, and color $\gamma n$ as color information. The opacity $\alpha n$ is a numerical parameter representing the shape of the object included in voxel data, and satisfies the expression $0 \leq \alpha n \leq 1$. The value $(1-\alpha n)$ indicates transparency. The expression opacity $\alpha n=1$ corresponds to non-transparent object, $\alpha n=0$ corresponds to transparent object and $0<\alpha n<1$ corresponds to semi-transparent object. The relationship between each voxel value and opacity an is set beforehand, and opacity $\alpha n$ is determined from the voxel value based on this relationship. For example, in the case of a volume rendered image of bone, bone can be displayed by associating an opacity "1" to the voxel value corresponding to bone, and an opacity "0" to other voxel values. A look-up table (LUT) function flexibly guides other values to correspond to certain values. The shading coefficient βn is a parameter representing the contour (shadowing) of the surface of the voxel data. The color γn represents tissue information of the voxel data, that is, whether the voxel data represent bone (white), blood (red), organ (yellow), or tumor (black) as an example.

Figure 8:
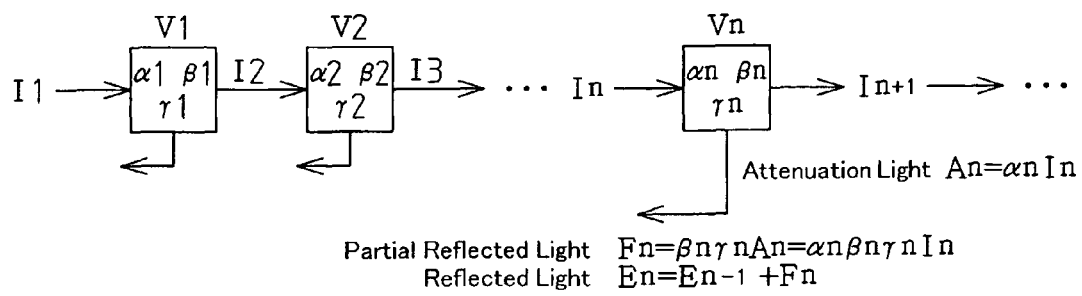
FIG. 8 is a block diagram illustrating the calculations of the ray casting method.

As shown in FIG. 8, an initial incidence ray (light ray) I1 sequentially passes through each voxel and is partially reflected and absorbed by each voxel. The remaining light (transmitted light) is gradually attenuated by the reflection and absorption. The process of FIG. 8 illustrating calculations of the ray casting method is a process for a single virtual ray in FIG. 6. The addition value (accumulated reflected light) of the partially reflected light Fn (n=1, 2, . . . ) in each voxel is equivalent to the brightness of the pixel PX at the frame FR. Since the attenuated light An (n=1, 2, . . . ) is expressed by the equation An=αn×In using the incidence light In of the nth voxel, the partially reflected light Fn can be expressed by the equation of Fn=βn×γn×An=βn×γn×αn×In.

Thus, the residual light In and the reflected light En, which is the accumulated reflected light, can be expressed by the following equations.

$$In = In-1 - \alpha n-1 \times In-1 = In-1 - An-1$$

$$En = En-1 + \alpha n \times \beta n \times \gamma n \times In = En-1 + Fn$$

As shown in FIG. 7, the reflected light En is added at each sampling position to generate an image as pixel values.

Figure 9:
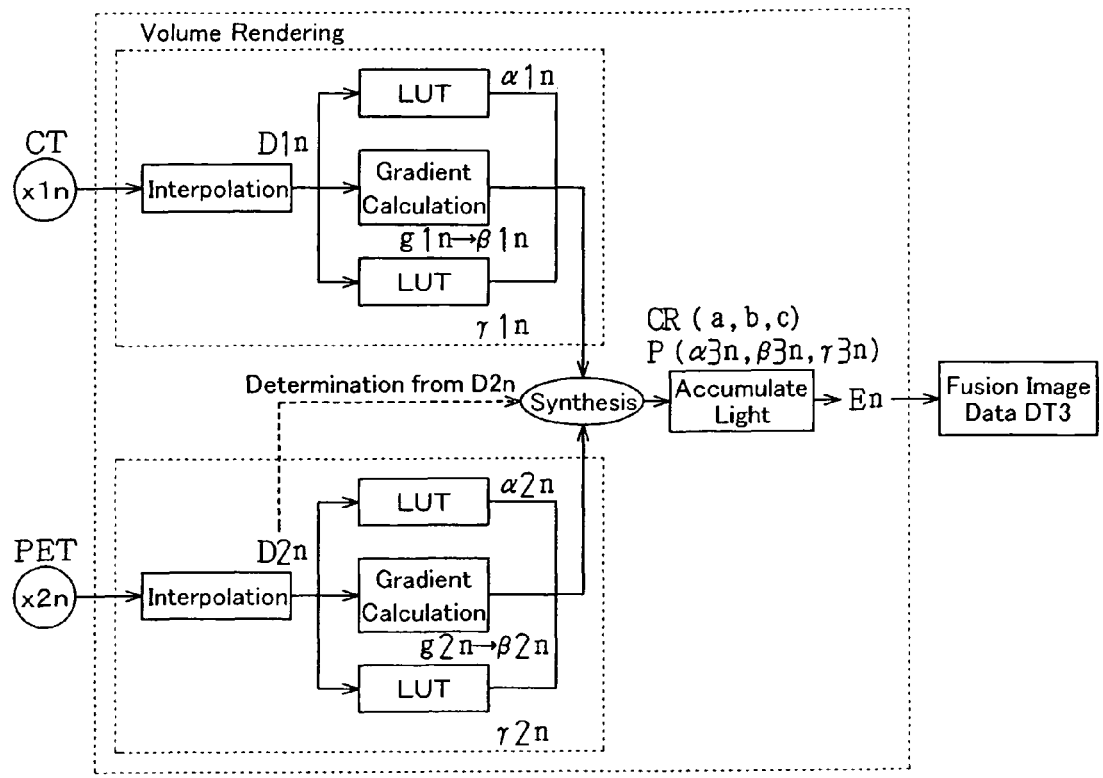
FIG. 9 is a schematic block diagram illustrating the image fusion process of the first embodiment of the present invention.

FIG. 9 is a schematic block diagram illustrating the image fusion process of the first embodiment. In the first embodiment, the projection start point O1 for starting the projection in the first voxel data VD1 is entered and stored beforehand in the memory section 8a by the user operating an input device such as the mouse 6. The projection start point O2 corresponding to the same coordinates as the projection start point O1 in the second voxel data VD2 is calculated by the CPU 7 and stored beforehand in the memory section 8a. Similarly, a sampling interval S1 which is the interval for sampling the first voxel data VD1, and a sampling interval S2 which is the interval for sampling the second voxel data VD2 are input using the mouse 6, and stored beforehand in the memory section 8a. The projection position (current position of the virtual ray position) X1n is calculated by accumulating the sampling interval S1 to the projection start point O1 in the first voxel data VD1 and storing the interval in the memory section 8a. Similarly, the projection position (current position of the virtual ray position) X2n is calculated by accumulating the sampling interval S2 to the projection start point O2 in the second voxel data VD2 and storing the interval in the memory section 8a.

In the first embodiment, the first voxel data VD1 and second voxel data VD2 are respectively provided with optical parameters P. That is, the optical parameter P of the first voxel data VD1 provides CT opacity α1n, CT shading coefficient β1n, and CT color γ1n, and the optical parameter P of the second voxel data VD2 provides PET opacity α2n, PET shading coefficient β2n, and PET color γ2n. The end points are stored beforehand in the memory section 8a. The CPU 7 synthesizes the optical parameter P of the first voxel data VD1 and the optical parameter P of the second voxel data VD2 from the projection start points O1 and O2 to the end points by the synthesis ratio CR determined for each of the current positions X1n and X2n.

Specifically, the synthesis ratio CR is provided with a first synthesis ratio as an opacity synthesis ratio, a second synthesis ratio as a shading synthesis ratio, and a third synthesis ratio as a color synthesis ratio. A first synthesis ratio a represents a ratio (synthesis ratio) for synthesizing the CT opacity α1n and the PET opacity α2n, and a second synthesis ratio b represents a synthesis ratio for synthesizing the CT shading coefficient β1n and the PET shading coefficient β2n. A third synthesis ratio c represents a synthesis ratio for synthesizing CT color γ1n and PET color γ2n. The synthesized optical parameters (synthesis opacity α3n as synthesis opacity information, synthesis shading coefficient β3n, and synthesis color γ3n as synthesis color information) can be expressed by the following equations using the synthesis ratio CR (first synthesis ratio a, second synthesis ratio b, and third synthesis ratio c).

$$\alpha 3n = a\alpha 1n + (1-a)\alpha 2n$$

$$\beta 3n = b\beta 1n + (1-b)\beta 2n$$

$$\gamma 3n = c\gamma 1n + (1-c)\gamma 2n$$

In the first embodiment, as shown in FIG. 9, the first synthesis ratio a, second synthesis ratio b, and third synthesis ratio c are respectively determined for each current position of the virtual ray according to the second voxel value D2n at the projection position X2n (current position of the virtual ray) of the PET image data DT2. Specifically, when the second voxel value D2n is less than or equal to a first threshold T1, the first synthesis ratio a is set at "1", and the synthesis opacity α3n is set at CT opacity α1n at the projection position (current position of the virtual ray position) X1n of the CT image data DT1. Furthermore, the third synthesis ratio c is also set at "1", and the synthesis color γ3n is set at CT color γ1n at the current position of the CT image data DT1. When the second voxel value D2n exceeds the first threshold T1, the first synthesis ratio a is similarly set at "1", and the third synthesis ratio c is set at "0", that is, the synthesis color γ3n is set at PET color γ2n at the projection position (current position of the virtual ray position) X2n of the PET image data DT2. In the first embodiment, the second synthesis ratio b is set at "1", regardless of the second voxel value D2n, that is, the synthesis shading coefficient β3n is set at the CT shading coefficient β1n at the current position X1n of the CT image data DT1. Although only the PET image data DT2 represents the presence of abnormal parts, the CT image data DT1 can represent details of the contours of the voxel data.

Therefore, fusion image data DT3 (fusion image P1) in which only the abnormal parts are highlighted is obtained by displaying an ordinary image based on the first voxel value D1n (CT value) in parts where the second voxel value D2n (PET value) is normal, and displaying synthesis color γ3n dependent on the second voxel data D2n in parts where the second voxel value D2n indicates abnormality.

As shown in FIG. 4, the computer 3 is provided with a graphics processing unit (GPU) 10. The GPU 10 is mainly a graphics controller chip that supports high-performance three-dimensional graphics function, and has a function of high-speed two-dimensional and three-dimensional graphic imaging based on a program supplied by the user. In the first embodiment, post processing is performed on the fusion image data DT3 by the GPU 10 to generate the fusion image P1. This reduces the time needed to display the fusion image P1.

Post processing is a process of correcting color, contrast, and brightness for displaying calculated fusion image data DT3 on an output device such as the monitor 4. Specifically, since the output (CT image, PET image and the like) of many medical imaging devices is 12-bit gray scale data, the fusion image P1 generated in the image fusing process is also 12-bit gray scale data. However, the monitor 4 of the computer 3 often displays images representing each color RGB in 8-bit data. Therefore, a conversion must be performed, such as WL conversion (window level transformation) and LUT conversion (color look-up table transformation), to display color, contrast, and brightness on the monitor 4. Affine transformation is also performed to match the size of the screen and the like.

The operation of the above image fusion process will now be discussed.

Figure 10:
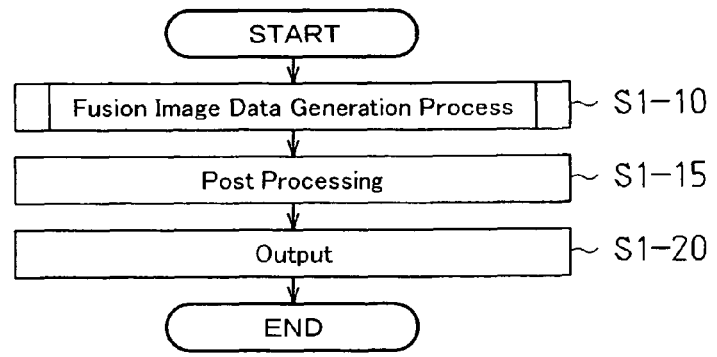
FIG. 10 is a flowchart illustrating the image fusion process of the first embodiment of the present invention.

FIG. 10 is a flowchart showing the image fusion process of the first embodiment.

Figure 11:
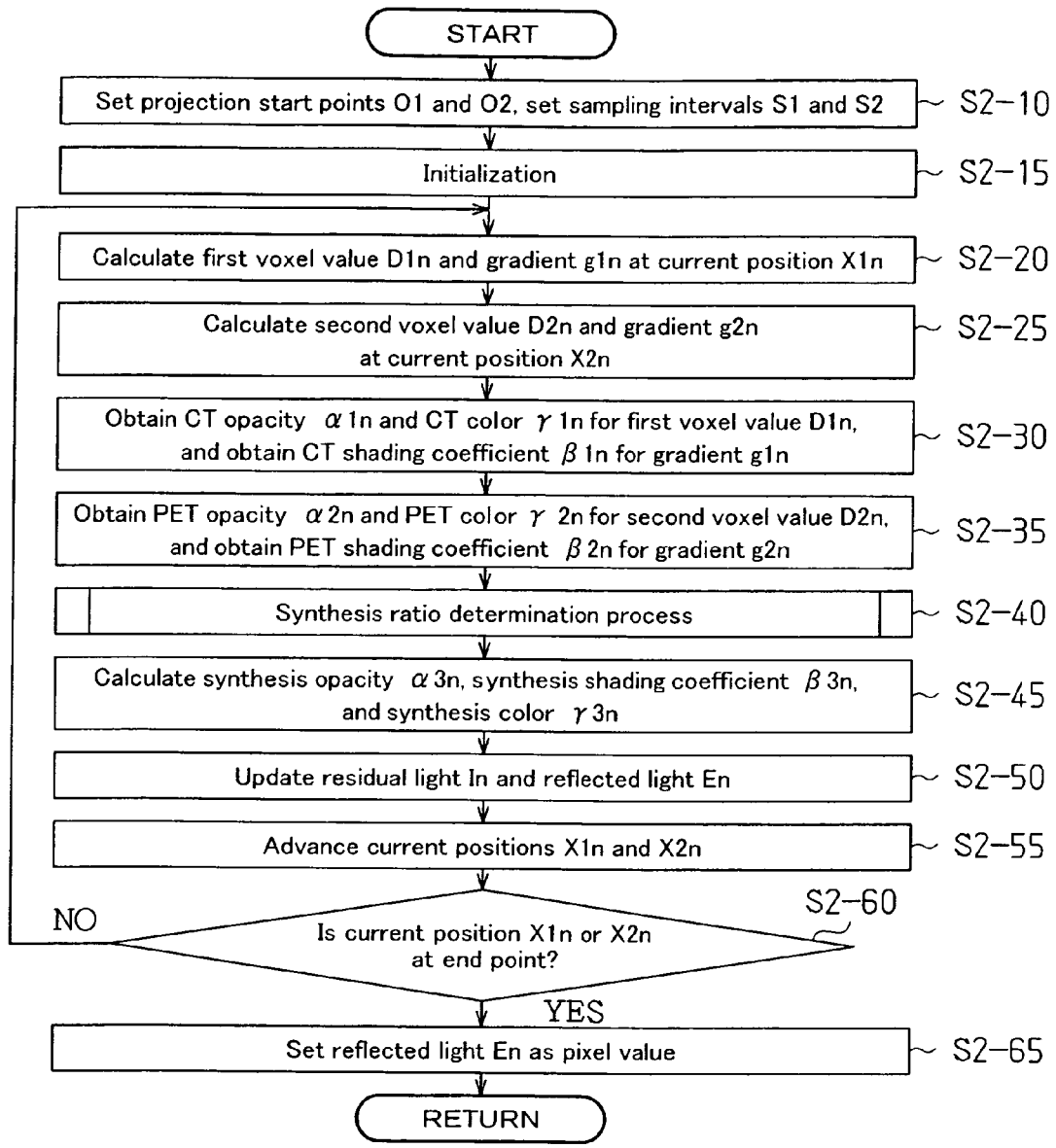
FIG. 11 is a flowchart illustrating the fusion image data generating process of the first embodiment of the present invention.
Figure 12:
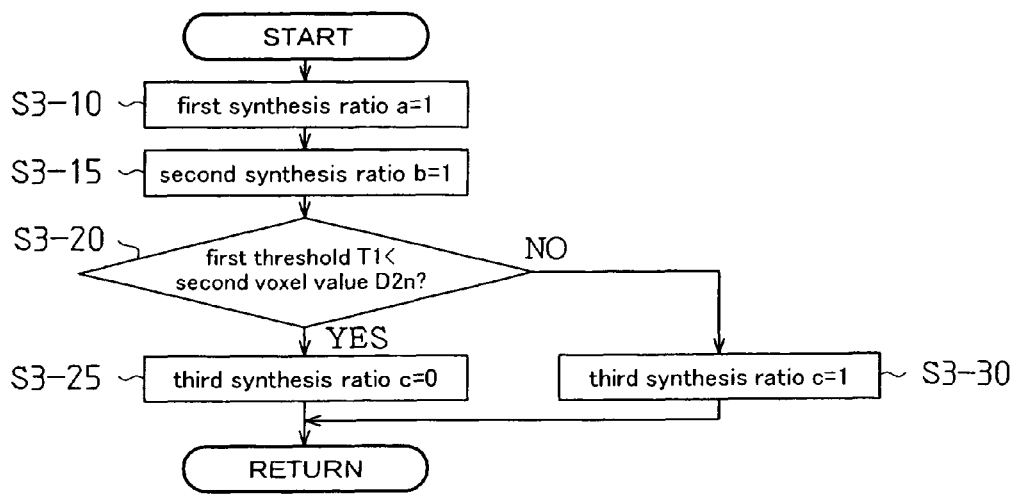
FIG. 12 is a flowchart illustrating the synthesis ratio determining process of the first embodiment of the present invention.

First, the CPU 7 executes a fusion image data generating process (step S1-10). In the fusion image data generating process, the process of FIG. 11 is executed. The CPU 7 first sets the projection start point O1 and sampling interval S1 in the first voxel data VD1, and the projection start point O2 and sampling interval S2 in the second voxel data VD2 (step S2-10). At this time, the CPU 7 stores the projection start points O1 and O2, and sampling intervals S1 and S2 in the memory section 8a. Next, the CPU 7 initializes the reflected light En, residual light In, and current positions X1n and X2n (step S2-15). That is, the reflected light En is set at "0", residual light In is set at "1", current position X1n is set at "O1" in the first voxel data VD1, and current position X2n is set at "O2" in the second voxel data VD2. Then, the CPU 7 calculates the first voxel value D1n and gradient g1n at the current position X1n (step S2-20). In the first embodiment, when the current position X1n is not placed on a grid, an interpolation process is performed using the voxel values of the voxels circumscribing the current position X1n to calculate the first voxel value D1n at the current position. The gradient g1n may be calculated by a well known method. Similarly, the CPU 7 calculates the second voxel value D2n and gradient g2n at the current position X2n (step S2-25).

Then, the CPU 7 calculates the CT opacity α1n and CT color γ1n corresponding to the first voxel value D1n, and the CT shading coefficient β1n corresponding to the gradient g1n. That is, the CT opacity α1n and CT color γ1n corresponding to the current position X1n are read from a look-up table stored in the optical parameter storage section MP. The CT shading coefficient β1n is calculated by a well known method using the gradient g1n. Similarly, the CPU 7 reads the PET opacity α2n and PET color γ2n corresponding to the second voxel value D2n from a look-up table stored in the optical parameter storage section MP, and calculates the PET shading coefficient β2n corresponding to the gradient g2n (step S2-35).

Next, the CPU 7 executes the synthesis ratio determining process (step S2-40). In the synthesis ratio determining process, the first synthesis ratio a, second synthesis ratio b, and third synthesis ratio c are determined for each current position. First, the CPU 7 sets the first synthesis ratio a at "1" (step S3-10). The CT opacity α1n of the CT image data DT1 is used as the synthesis opacity α3n via this setting. The CPU 7 sets the second synthesis ratio b at "1" (step S3-15). The CT shading coefficient β1n of the CT image data DT1 is used as the synthesis shading coefficient β3n via this setting. Then, the CPU 7 determines whether or not the second voxel value D2n is greater than the first threshold T1 (step S3-20). The CPU 7 compares the second voxel value D2n with the first threshold T1 read from the threshold storage section SV. When the second voxel value D2n is greater than the first threshold T1 (step S3-20: YES), the third synthesis ratio c is set at "0" (step S3-25). That is, since the PET value expresses abnormal tissue, the PET color γ2n of the PET image data DT2 is used as the synthesis color γ3n. When the second voxel value D2n is less or equal to than the first threshold T1 (step S3-20: NO), the third synthesis ratio c is set at "1" (step S3-30). That is, since the PET value expresses normal tissue, the CT color γ1n of the CT image data DT1 is used as the synthesis color γ3n. Then, the CPU 7 stores the synthesis ratio CR in the synthesis ratio storage section CV, and the synthesis ratio determining process ends.

When the synthesis ratio determining process ends, the synthesis opacity α3n, synthesis shading coefficient β3n, and synthesis color γ3n are calculated based on the first synthesis ratio a, second synthesis ratio b, and third synthesis ratio c (step S2-45 in FIG. 8). That is, the CPU 7 reads the synthesis ratio CR from the synthesis ratio storage section CV, reads the CT opacity α1n, CT shading coefficient β1n, and CT color γ1n (PET color γ2n) from the optical parameter storage section MP, and calculates the synthesis opacity α3n, synthesis shading coefficient β3n, and synthesis color γ3n. Then, the CPU 7 updates the residual light In and reflected light En using the optical parameters P (step S2-50). Specifically, the CPU 7 first calculates the attenuation light An (=α3nIn), and partially reflected light Fn (=β3nγ3nAn). Then, the residual light In and reflected light En are updated using the calculated attenuation light An and partially reflected light Fn. The processes of steps S2-10 through S2-50 are hereinafter referred to as the fusion process.

Next, the CPU 7 advances the current positions X1n and X2n (step S2-55). That is, the CPU 7 reads the sampling intervals S1 and S2 from the memory section 8a, and advances the current position X1n at the sampling interval S1, and the current position X2n at the sampling interval S2. Then, the CPU 7 determines whether or not the current position X1n or the current position X2n is at the predetermined end point (step S2-60). That is, the CPU 7 reads the end points from the memory section 8a, and respectively compares them to the current positions X1n and X2n. When the current position X1n and current position X2n are not at an end point (step S2-60: NO), the CPU 7 executes the fusion process again. When the current position X1n or current position X2n is at an end point (step S2-60: YES), however, the CPU 7 sets the reflected light En as the pixel value (step S2-65), and the fusion image data generating process ends for the single pixel configuring the frame FR.

When the fusion image data DT3 is generated after the fusion image data generating process ends for all pixels in the frame FR, the GPU 10 performs post processing of the fusion image data DT3 to generate a fusion image P1 (step S1-15 in FIG. 10). When post processing ends, the fusion image P1 is output to the screen 4a of the monitor 4 as shown in FIG. 5 (step S1-20 of FIG. 10). The fusion image P1 uses, as the optical parameters P (synthesis opacity α3n, synthesis shading coefficient β3n, and synthesis color γ3n), the CT opacity α1n and CT color γ1n of the CT image data DT1 in normal part in which the PET value is normal at the respective current positions X2n. On the other hand, the fusion image P1 uses the PET color γ2n of the PET image data DT2 in the abnormal part U1 in which the PET value expresses abnormal tissue. Therefore, an enhanced fusion image P1 is generated in which the normal part is displayed normally based on the CT image data DT1, and only the abnormal part U1 is displayed based on the PET image data DT2.

That is, the shape of the watched object is managed based on the CT image data DT1, and the condition of the watched object is managed based on the PET image data DT2. Therefore, a more accurate diagnostic image is possible compared to when a conventional image fusing process is used, since the position of the abnormal part U1 is understood while observing the shape and condition of the watched object without being hindered by the color of the PET image.

The image display device 1 of the first embodiment of the present invention has the following advantages.

(1) The first synthesis ratio a, second synthesis ratio b, and third synthesis ratio c are calculated for each sampling position. As a result, the fusion image P1 is generated by synthesizing a plurality of optical parameters P (opacity, shading coefficient, and color) by a synthesis ratio CR determined in accordance with the second voxel value $D2n$ for each current position $X1n$ and $X2n$. Therefore, a fusion image P1 is generated with no degeneration of the amount of information since a plurality of optical parameters P, which are information representing independent optical characteristics, are synthesized for each current position $X1n$ and $X2n$.

(2) The first synthesis ratio a, second synthesis ratio b, and third synthesis ratio c are calculated for each sampling position. As a result, the synthesis ratio CR suited for the organ and condition of the organ is dynamically calculated for each of a plurality of optical parameters P, and the abnormal part U1 is highlighted without hindering observation of the normal part or the shape of the abnormal part U1. Accordingly, a more accurate observation can be made compared to when a conventional image fusion process is used.

(3) A fusion image P1 is generated by synthesizing a plurality of optical parameters P dependent on the CT image data DT1 obtained by a CT scan, and a plurality of optical parameters P dependent on the PET image data DT2 obtained by a PET scan using a synthesis ratio CR determined in accordance with the second voxel value D2 for each current position $X1n$ and $X2n$. As a result, a fusion image P1, which utilizes the characteristics of the CT image data and the PET image data, is generated with no degeneration in the amount of information since optical parameters P, which are information representing independent optical characteristics, are synthesized for each current position $X1n$ and $X2n$.

(4) Since the synthesis ratio CR is determined for each current position $X1n$ and $X2n$, an image is generated with characteristics of the CT image data DT1 and PET image data DT2 fused according to the second voxel value $D2n$ for each current position $X1n$ and $X2n$. Accordingly, a more accurate diagnostic image can be made compared to when a conventional image fusion process is used.

(5) A single fusion image P1 fusing the CT image data DT1 and PET image data DT2 is displayed on the screen 4a of the monitor 4. Accordingly, a more accurate observation can be made compared to when observing CT and PET images arranged side-by-side.

(6) Since the calculations in the synthesis ratio determining process are not complex, the synthesis of a plurality of types of image data, the generation of a fusion image P1, and display of the fusion image P1 on the screen 4a of the monitor 4 may be accomplished in real time.

(7) Optical parameters P respectively dependent on the CT image data DT1 and PET images data DT2 are fused three-dimensionally in the fusion image P1. Therefore, more accurate observations are made since observation from different viewing direction is possible compared, for example, to when the CT image data DT1 and PET image data DT2 are two-dimensionally fused.

(8) Optical parameters P respectively dependent on the CT image data DT1 and PET images data DT2 are fused three-dimensionally in the fusion image P1. Therefore, more accurate observations are made compared to a conventional image fusing process since the observer can recognize the front-to-back relationship.

(9) When the second voxel value $D2n$ is greater than a first threshold T1, that is, when there is an abnormal part U1, only the abnormal part U1 is highlighted since the PET color $\gamma 2n$ dependent on the PET image data DT2 is used as the synthesis color $\gamma 3n$.

(10) The abnormal part U1 is highlighted without hindering observation of the normal part or the shape of the abnormal part since the CT opacity $\alpha 1n$ and CT shading coefficient $\beta 1n$ of the CT image data DT1 are used as the synthesis opacity $\alpha 3n$ and synthesis shading coefficient $\beta 3n$ among the optical parameters P. Accordingly, a more accurate observation can be made compared to when a conventional image fusion process is used.

Second Embodiment

An image display device according to a second embodiment of the present invention will now be discussed with reference to FIGS. 13 to 15. In the second embodiment, the determination of the synthesis ratio CR in the synthesis ratio determining process is performed at multiple-stage, and the displayed abnormal part is three-dimensionally included in the tissue part, for example, a tumor metastasized to bone. Parts similar to the first embodiment are referenced by identical reference numbers, and further description of these parts is omitted.

Figure 13:
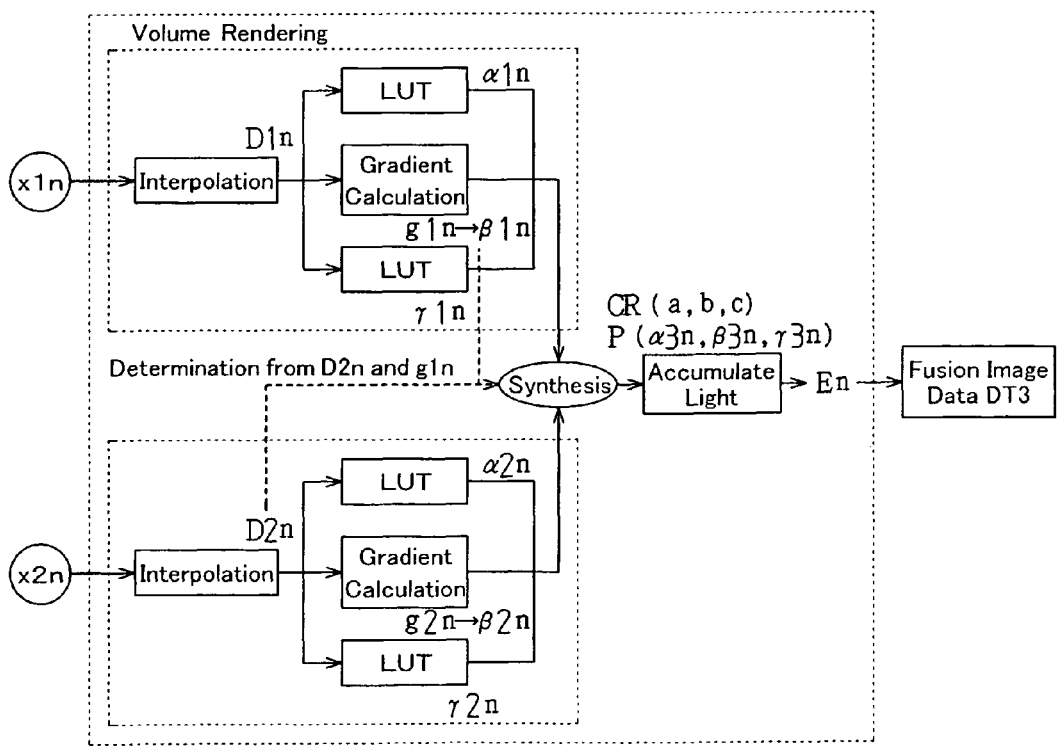
FIG. 13 is a schematic block diagram illustrating image fusion process according to a second embodiment of the present invention.

In the second embodiment, the synthesis ratio CR is determined according to the gradient $g1n$ of the CT image data DT1 and the second voxel value $D2n$ of the PET image data DT2, as shown in FIG. 13. Specifically, as shown in FIG. 5, an observer can verify the abnormal part U2 since the tissue part with a high CT value (first voxel value $D1n$) and the part shadowed in the direction of projection of the observer are displayed in black even when the part with a high PET value (second voxel value $D2n$) desired for display in the fusion image, that is, the abnormal part U2, is within the tissue of the watched object. In the second embodiment, when the CT value is high and the PET value is high, information obtained from the PET image data DT2 is displayed with priority by setting the synthesis opacity $\alpha 3n$ and synthesis color $\gamma 3n$ to values according to the PET value.

The second embodiment is applicable, for example, when it is desirable to highlight metastasis of a tumor (abnormal part U2) to bone. The CT image data DT1 represents bone, and the PET image data DT2 represents the tumor. In this case, in order to determine a synthesis ratio CR which is capable of displaying both tumor and bone, a first intermediate variable d, a second intermediate variable e, and a third intermediate variable f are calculated and stored in the memory section 8a. The first intermediate variable d is for displaying the region of the bone and its surroundings. Since the CT value (first voxel value $D1n$) represents a value of 1000 or higher in the bone region, the first intermediate variable d can be expressed by the following equation.

first intermediate variable $d=D1n/1000$

The region of the bone and a region including most of the area surrounding the bone can be flexibly represented by the first intermediate variable d. Unsuitable results caused by values outside the range are reduced by setting a maximum value of the first intermediate variable d at "1" and a minimum value at "0".

The second intermediate variable e represents the abnormal part U2. Since the PET value (second voxel value $D2n$) is 100 or higher in the abnormal part U2, the second intermediate variable e can be expressed by the following equation.

second intermediate variable $e=D2n/100$

The degree of abnormality can be represented with greater flexibility by the second intermediate variable e. Unsuitable results caused by values outside the range are reduced by setting a maximum value of the second intermediate variable e at "1" and a minimum value at "0".

The third intermediate variable f represents locations combining the conditions of both the bone region and tumor region, using PET image data DT2 information (tumor information) in particular.

third intermediate variable $f=1-d\times e$

The operation of the above synthesis ratio determining process will now be described.

Figure 14:
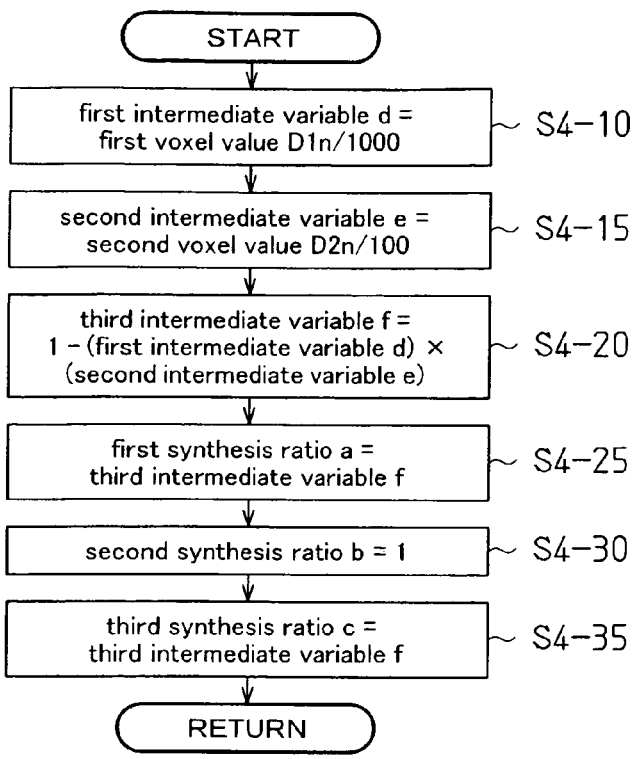
FIG. 14 is a flowchart illustrating the synthesis ratio determining process of the second embodiment of the present invention.
Figure 15:
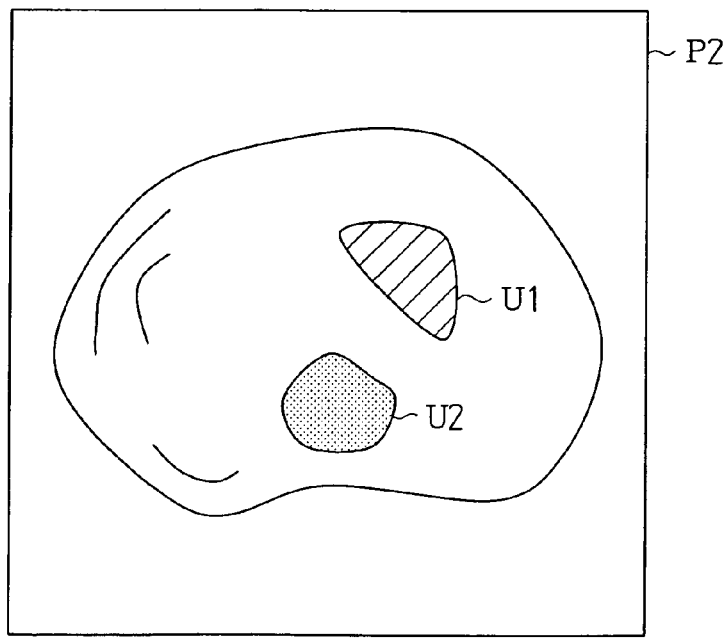
FIG. 15 is a schematic diagram of the fusion image of the second embodiment of the present invention.

FIG. 14 is a flowchart of the synthesis ratio determining process for each voxel.

First, the CPU 7 calculates the first intermediate variable d (step S4-10). That is, the first intermediate variable is calculated using the first voxel value D1$n$, and stored in the memory section 8$a$. Then, the CPU 7 calculates the second intermediate variable e (step S4-15). That is, the second intermediate variable e is calculated using the second voxel value D2$n$, and stored in the memory section 8$a$. Then, the CPU 7 calculates the third intermediate variable f (step S4-20). That is, the first intermediate variable d and the second intermediate variable e are read from the memory section 8$a$, and the third intermediate variable f is calculated and stored in the memory section 8$a$. Then, the CPU 7 substitutes the third intermediate variable f for the first synthesis ratio a, and stores the value in the synthesis ratio storage section CV (step S4-25). Then, the CPU 7 substitutes "1" for the second synthesis ratio b, and stores the value in the synthesis ratio storage section CV (step S4-30). Next, the CPU 7 substitutes the third intermediate variable f for the third synthesis ratio c, and stores the value in the synthesis ratio storage section CV (step S4-35), whereupon the synthesis ratio determining process ends. Thereafter, the CPU 7 executes the same image fusing process as in the first embodiment. As a result, a fusion image P2 is obtained in which it is possible to observe an abnormal part U2, such as a tumor (second voxel value D2$n$) metastasized to bone (first voxel value D1$n$), as shown in FIG. 15.

Therefore, a fusion image P2 can be displayed even when the PET value (second voxel value D2$n$) is high and the abnormal part U2 desired to appear in the fusion image P2 is included 3-dimensionally within the part with the high CT value (first voxel value D1$n$). Since the synthesis ratio CR (first synthesis ratio a, second synthesis ratio b, third synthesis ratio c) is settable at multiple-stage for each current position X1$n$ and X2$n$ by the first intermediate variable d, second intermediate variable e, and third intermediate variable f, an even more precise fusion image P2 is obtained compared to when conventional image fusing processes are used.

The image display device of the second embodiment of the present invention has the following advantages in addition to the advantages (1) through (8) of the image display device 1 of the first embodiment.

(11) For a location which could be displayed in black on the fusion image P2, it is determined whether the major cause of the black display is the CT value (first voxel value D1$n$) or the gradient g1$n$ (shadow) of the first voxel value D1$n$, and in case the cause is the CT value, the PET value (second voxel value D2$n$) is displayed with priority over the CT value. As a results for example, an abnormal part U2 can be observed within the tissue of a tumor metastasized to bone.

(12) Since a synthesis ratio CR is set at multiple-stage by the first intermediate variable d, second intermediate variable e, and third intermediate variable f, and this synthesis ratio CR is used to generate a fusion image P2, the generated fusion image P2 further utilizes the characteristics of the CT image data DT1 and PET image data DT2 compared to when conventional image fusion processes are used.

(13) The first intermediate variable d is calculated by the first voxel value D1$n$ and a predetermined CT value ("1000"), and the second intermediate variable e is calculated by the second voxel value D2$n$ and a predetermined PET value ("100"). As a result, criteria for calculating the synthesis ratio CR can be changed by changing the predetermined CT value and predetermined PET value. Therefore, fusion images P1 corresponding to diverse watched objects can be generated.

(14) When determining the synthesis ratio CR, it is considered whether the cause for a pixel being displayed in black on the fusion image P2 is the CT value (first voxel value D1$n$) or the gradient g1$n$ (shadow). As a result, for example, the PET value (second voxel value D2$n$) of a part surrounded three-dimensionally by a part with high CT value (first voxel value D1$n$) can be displayed on the fusion image P1, while shadow is expressed according to the change in the direction of projection of the observer.

Third Embodiment

An image display device according to a third embodiment of the present invention will now be discussed with reference to FIGS. 16 to 19. In the third embodiment, a mask region is generated, and only the mask region of the watched object is displayed as a fusion image P3. Parts similar to the first and second embodiments are referenced by identical reference numbers, and further description of these parts is omitted.

Figure 16:
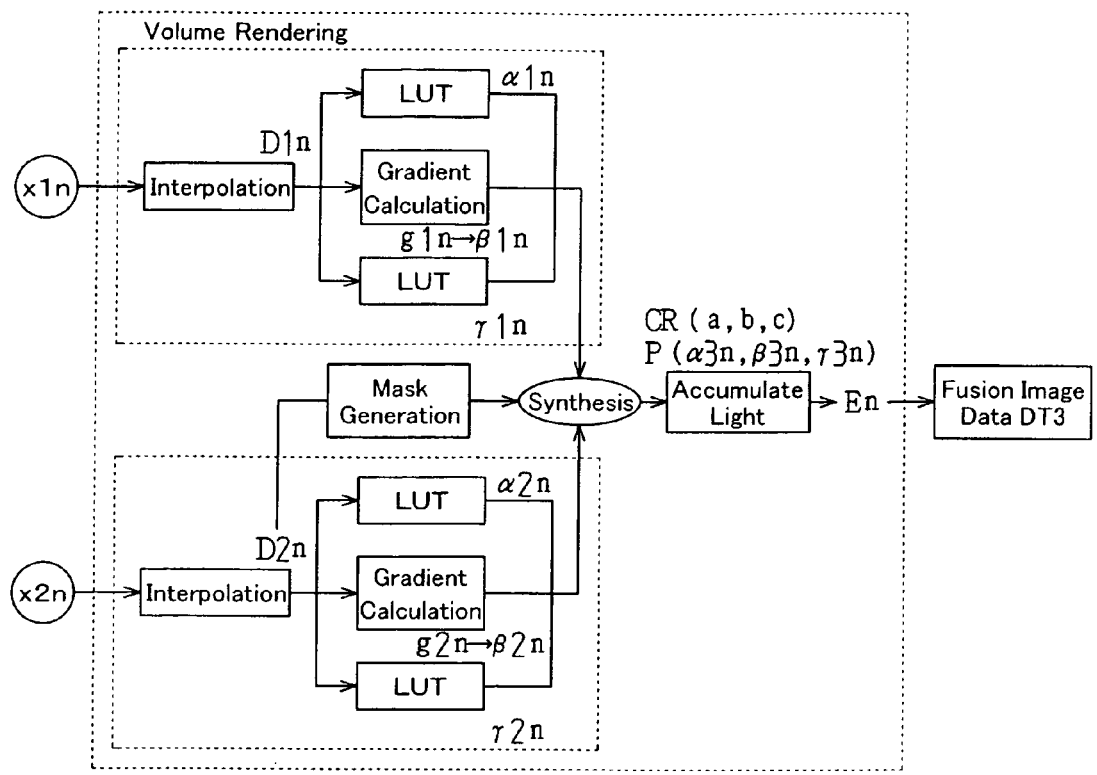
FIG. 16 is a schematic block diagram illustrating the image fusion process according to a third embodiment of the present invention.
Figure 17:
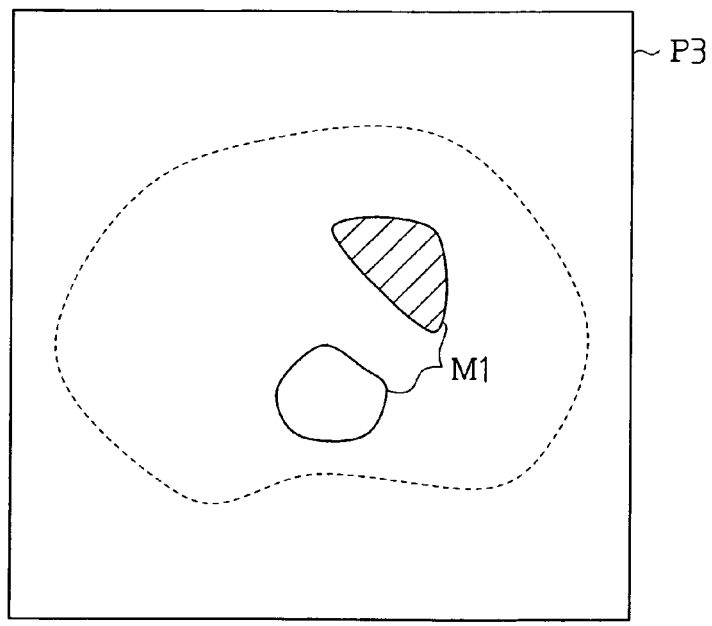
FIG. 17 is a schematic diagram showing a fusion image of the third embodiment of the present invention.

In the third embodiment, a mask region M1 corresponding to the second voxel value D2$n$ is generated, as shown in FIGS. 16 and 17. The location at which the second voxel value D2$n$ (PET value) exceeds the second threshold T2 is an abnormal part and assumed to be within the mask region M1. However, the location at which the second voxel value D2$n$ (PET value) is less than or equal to the second threshold T2 is a normal part, and assumed to be outside the mask region M1. The synthesis ratio determining process is performed to determine the first synthesis ratio a, second synthesis ratio b, and third synthesis ratio c only for each current position within the mask region M1. In the third embodiment, the second threshold T2 is stored beforehand in the threshold storage section SV. The CPU 7 (computer 3) executes the image fusion process program of the image fusion process (mask region generating process). Thus, the computer 3 functions as a mask region generating means.

The operation of the above fusion image data generating process is described below.

Figure 18:
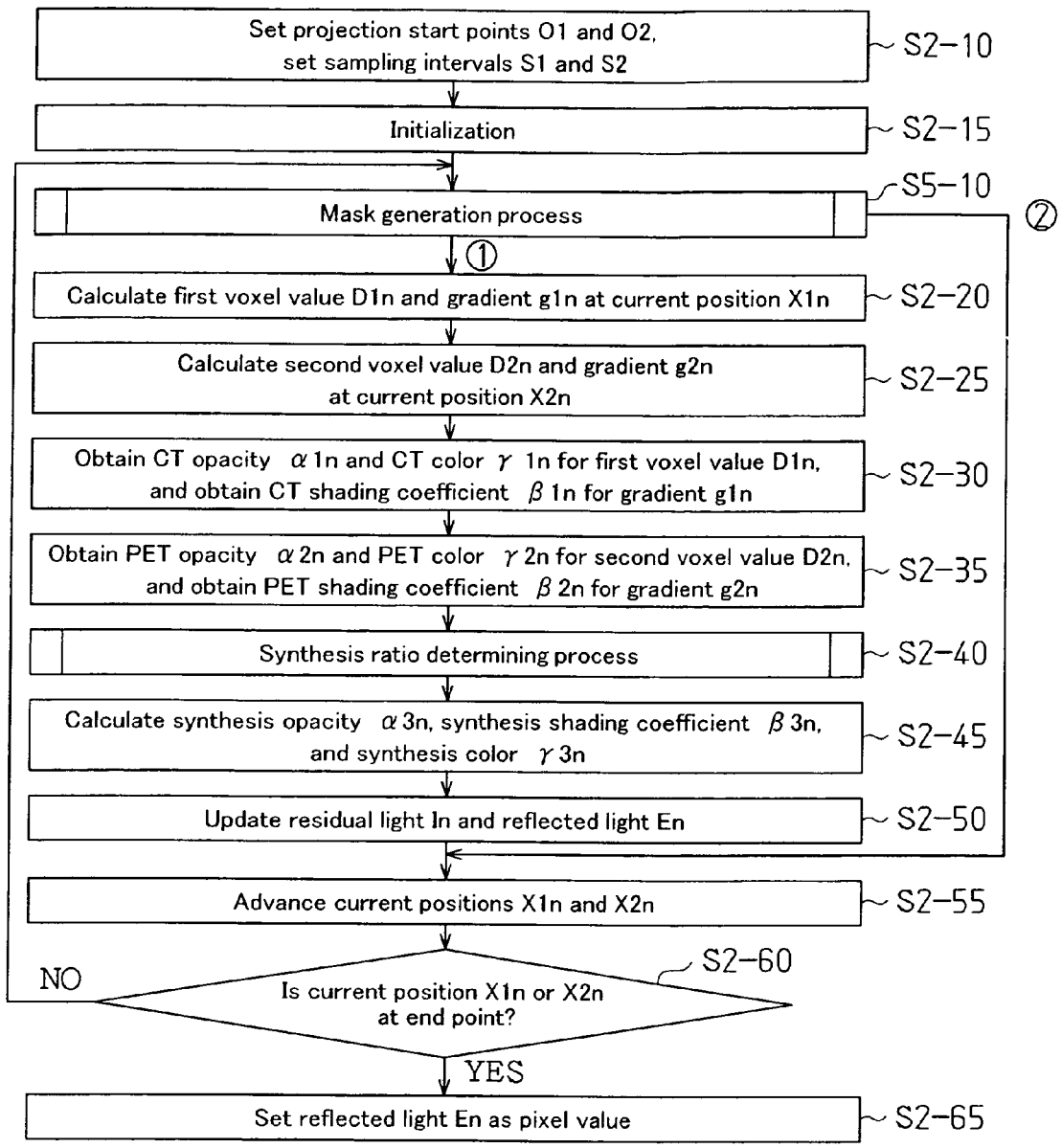
FIG. 18 is a flowchart illustrating the fusion image data generating process of the third embodiment of the present invention.

FIG. 18 is a flowchart of the fusion image data generating process for each pixel.

Figure 19:
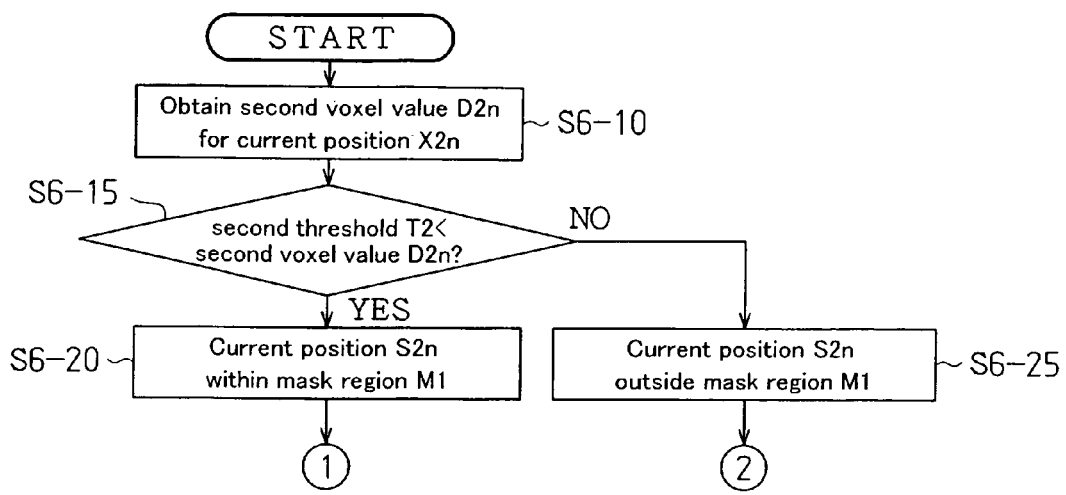
FIG. 19 is a flowchart illustrating the mask generating process of the third embodiment of the present invention.

First, the CPU 7 sets the projection start point O1 and sampling interval S1, and projection start point O2 and sampling interval S2 (step S2-10), and initializes the reflected light En, residual light In, and current positions X1$n$ and X2$n$ (step S2-15). Next, the mask generating process is executed (step S5-10). In the mask generating process, the process shown in FIG. 19 is executed. First, the CPU 7 calculates the second voxel value D2$n$ at the current position X2$n$ (step s6-10) and determines whether or not the second voxel value D2$n$ exceeds the second threshold T2 (step S6-15). That is, the CPU 7 reads the second threshold T2 from the threshold storage section SV to compare the second voxel value D2$n$ with the read threshold T2. When the second voxel value D2$n$ exceeds the second threshold T2 (step S6-15: YES), the CPU 7 determines that the current position X2$n$ is within the mask region M1 (step S6-20) and executes the fusion process.

However, when the second voxel value D2n is less than or equal to the second threshold T2 (step S6-15: NO), the CPU 7 determines that the second voxel value D2n is outside the mask region M1 (step S6-25) and does not execute the fusion process.

In either case, the CPU 7 advances the current positions X1n and X2n (step S2-S5 of FIG. 18), and determines whether or not either of the current positions X1n or X2n is a predetermined end point (step S2-60). When the current position X1n and current position X2n are not at an end point (step S2-60: NO), the CPU 7 executes the mask generating process and fusion process again. When the current position X1n or current position X2n is an end point (step S2-60: YES), however, the CPU 7 sets the reflected light En as the pixel value (step S2-65), and the fusion image data generating process ends for the single pixel configuring the frame FR.

Thereafter, the CPU 7 executes the same image fusing process as in the first and second embodiments. As a result, as shown in FIG. 17, the fusion image P3 is obtained which displays only the location with the high PET value (second voxel value D2n) suspected for being a tumor. Thus, the fusion image P3 displays only the desired location for observation.

The image display device of the third embodiment of the present invention has the following advantages in addition to the advantages (1) through (8) of the image display device 1 of the first embodiment.

(15) Since a mask region M1 corresponding to the second voxel value D2n is generated dynamically, only the abnormal part desired for observation and its surrounding area are displayed in the fusion image P3. As a result, the watched object is accurately specified and observed.

(16) Since a mask region M1 corresponding to the second voxel value D2n is generated dynamically, only the abnormal part desired for observation and its surrounding area are displayed in the fusion image P3. As a result, the time required to display the fusion image P3 is reduced. Therefore, the fusion image P3 can be observed in real time more quickly than when conventional image fusion processes are used.

(17) Since the mask generating process is executed prior to the fusion process, the fusion process is not required for the part outside the mask region M1. As a result, the time required for the fusion process is reduced. Therefore, the fusion image P3 can be observed in real time more quickly than when conventional image fusion processes are used.

Fourth Embodiment

In the first embodiment, the image fusion process is executed by the computer 3, which is a single workstation or the like. In an image display device according to a fourth embodiment of the present invention, however, at least one of the processes configuring the image fusion process is distributed to a plurality of computers. In the fourth embodiment, parts common to the first through third embodiments are referenced by identical reference numbers, and further description is omitted.

Figure 20:
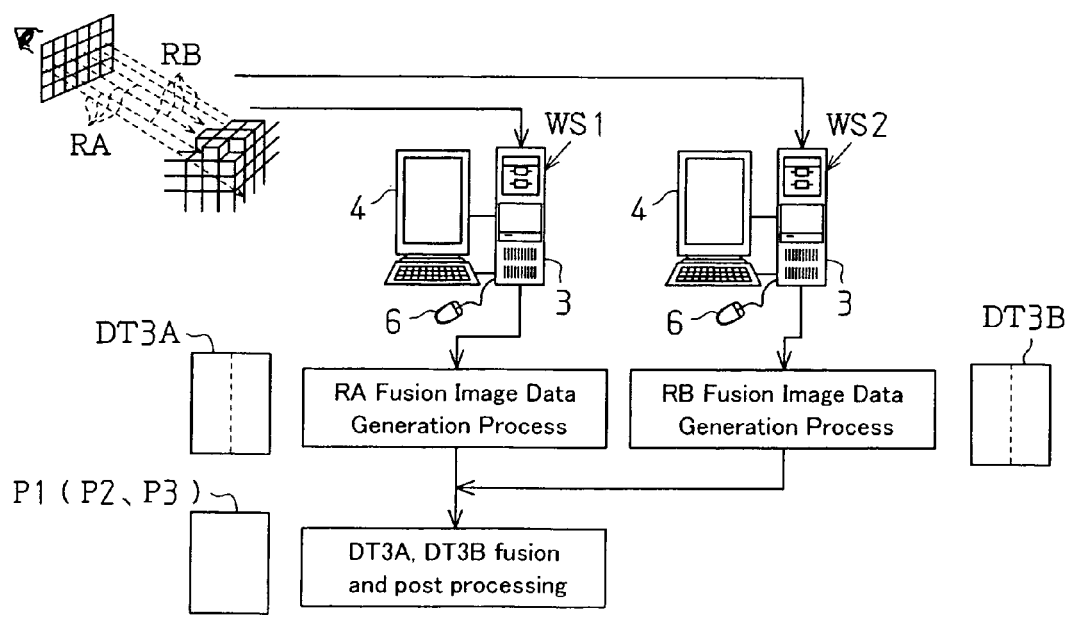
FIG. 20 is a schematic block diagram showing a dispersion process for an image fusion process according to a fourth embodiment of the present invention.
Figure 21:
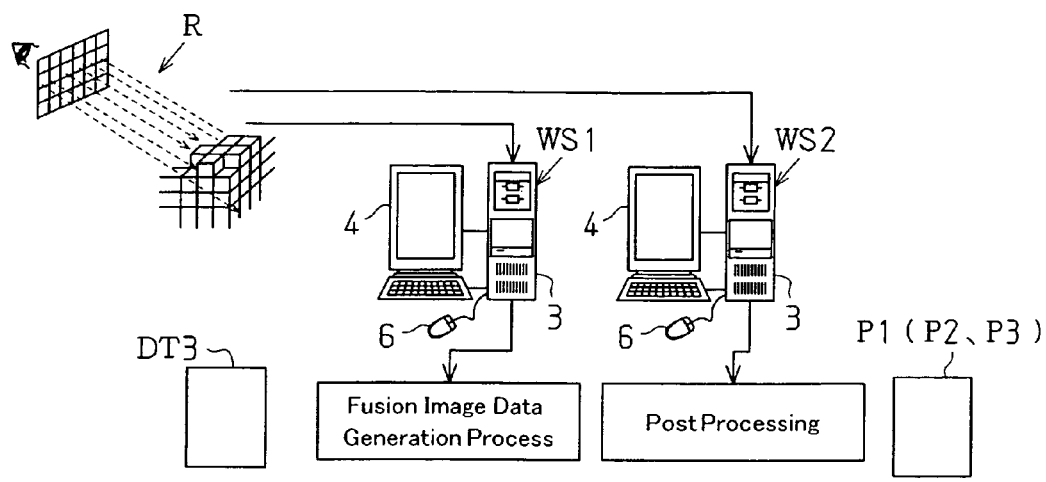
FIG. 21 is a schematic block diagram showing the dispersion process of the image fusion process of the fourth embodiment of the present invention.

In the fourth embodiment, for example, at least one process is distributed to a plurality of computers within a hospital network to which a plurality of workstations are connected. As examples of distributed processing of the image fusion process, the cases described below pertain to the distribution of a plurality of virtual rays R, and to division of only the post processing. To facilitate the following description, an example is described in which two workstations WS1 and WS2 are used to generate a 512×512 size image, and this process is distributed to a number of workstations, as shown in FIGS. 20 and 21. In the fourth embodiment, only the workstation WS2 is provided with a GPU 10.

Example 1

As shown in FIG. 20, example 1 illustrates a case in which virtual rays R are divided into virtual rays RA (virtual rays R1 through Rk) and virtual rays RB (virtual rays Rk+1 through Rn). The voxels V1 through Vn are divided into voxels V1 through Vk through which the virtual rays RA pass, and the voxels Vk+1 through Vn through which the virtual rays RB pass. The division of the virtual rays RA and RB is performed so as to duplicate a part of the first voxel data VD1 (second voxel data VD2) and the data have redundancy. This redundancy is necessary because of the necessity of surrounding voxels for the interpolation calculation and the like when determining the first voxel value D1n (second voxel value D2n) when a virtual ray RA and RB do not arrive at a grid point. In this case, the image fusion process is performed by the workstations WS1 and WS2, respectively. Therefore, the memory capacities and the amount of transfer of the synthesis ratio storage section CV, optical parameter storage section MP, and reflected light memory section RV of each workstation are half the size of the entire fusion image. The process sequence is described below.

(1-1) The workstation WS1 performs the fusion process for the first voxel data VD1 (second voxel data VD2 (voxels V1 through Vk)) of the virtual rays RA. Then, the reflected light EAn is calculated and stored in the reflected light memory section RVA. The workstation WS2 performs the fusion process for the first voxel data VD1 (second voxel data VD2 (voxels Vk+1 through Vn)) of the virtual rays RB. Then, the reflected light EBn is calculated and stored in the reflected light memory section RVB.

(1-2) The reflected light EBn stored in the reflected light memory section RVB of the workstation WS2 is transferred to the workstation WS1. The size of the transferred data is 512×256.

(1-3) The workstation WS1 performs post processing of the reflected light En stored in the reflected memory section RV, which is synthesized from the reflected light EAn of the reflected light memory section RVA and the reflected light EBn of the reflected light memory section RVB. As a result, a fusion image P1 (P2, P3), which fuses the CT image data DT1 and the PET image data DT2, is obtained.

Example 2

As shown in FIG. 21, example 2 describes a case in which only the post processing is distributed. In this case, the workstation WS1 performs the fusion image data generating process for all the first voxel data VD1 and second voxel data VD2. Then, the workstation WS2, which incorporates the GPU 10 suited for high-speed image processing, performs the post process. Therefore, the time required for post processing is reduced. The process sequence is described below.

(2-1) The workstation WS1 performs the fusion image data generating process on the first voxel data VD1 and second voxel data VD2 and stores the calculated fusion image data DT3 in the memory section 8a.

(2-2) The fusion image data DT3 stored in the memory section 8a of the workstation WS1 is transferred to the workstation WS2. The size of the transferred data at this time is 512×512.

(2-3) The workstation WS2 performs post processing on the fusion image data DT3. As a result, a fusion image P1 (P2, P3), which fuses the CT image data DT1 and the PET image data DT2, is obtained.

The image displaying device of the fourth embodiment of the present invention has the following advantages in addition to the advantages (1) through (17) of the image display devices of the first through third embodiments.

(18) The speed of the image fusion process is improved since it is performed by distributed processing via a plurality of computers 3. As a result, for example, the real time display of the fusion image P1 (P2, P3) on the screen 4a of the monitor 4 is ensured.

(19) Since distributed processing by a plurality of computers 3 is performed, the amount of memory for use for the reflected light memory section RV is reduced in each device.

It should be apparent to those skilled in the art that the present invention may be embodied in many other specific forms without departing from the spirit or scope of the invention. Particularly, it should be understood that the present invention may be embodied in the following forms.

In the first embodiment, when the second voxel value D2$n$ is greater than the predetermined threshold T1 in the synthesis ratio determining process, the synthesis color γ3$n$ uses the PET color γ2$n$, which is dependent on the PET image data DT2. However, the predetermined first threshold T1 can be variable. That is, first thresholds T1 corresponding to types of watched objects may be stored beforehand using an input device such as the keyboard 5, and a user may make a selection from plural types of second thresholds T2 using an input device such as the mouse 6. Thus, the synthesis ratio is determined more dynamically.

In the first embodiment, the first voxel value D1$n$ and gradient g1$n$ are first calculated at the current position X1$n$, then the second voxel value D2$n$ and gradient g2$n$ are calculated at the current position X2$n$. Thereafter, the CT opacity α1$n$, CT shading coefficient β1$n$, and CT color γ1$n$ are calculated (step S2-30), and the PET opacity α2$n$, PET shading coefficient β2$n$, and PET color γ2$n$ are calculated (step S2-35). This order may be changed so that the first voxel value D1$n$ and gradient g1$n$ at the current position X1$n$ are first calculated (step S2-20) and the CT opacity α1$n$, CT shading coefficient β1$n$, and CT color γ1$n$ are then calculated (step S2-30). Thereafter, the second voxel value D2$n$ and gradient g2$n$ may be calculated at the current position X2$n$ (step S2-25), and then the PET opacity α2$n$, PET shading coefficient β2$n$, and PET color γ2$n$ may be calculated (step S2-35).

In the first embodiment, the abnormal part U1 is highlighted using the optical parameter P dependent on the PET image data DT2. For example, an animation in which an abnormal part U1 is flashed can be generated by generating two fusion images P1, one in which the abnormal part U1 is highlighted and another in which the abnormal part U1 is not highlighted, and alternatingly displaying the two images. Thus, an observer can more intuitively grasp the abnormal part U1.

In the second embodiment, the first synthesis ratio a and third synthesis ratio c are determined at multiple-stage according to the first voxel value D1$n$ and second voxel value D2$n$, and the CT shading coefficient β1$n$ is used as the second synthesis ratio b. However, the gradient g1$n$ may be determined as whether it is greater than a predetermined threshold, and a determination may be made as to whether or not it is displayed in black on the screen. That is, when the gradient g1$n$ is a value greater than a predetermined threshold, the current positions X1$n$ and X2$n$ are parts in shadow when viewed and are displayed in black on the screen regardless of the CT value and PET value. Thus, they may be used as initial values without calculating the first synthesis ratio and third synthesis ratio. As a result, the fusion image P2 can be display in real time more quickly since there are fewer calculations performed in the synthesis ratio determining process.

In the second embodiment, the first intermediate variable d and second intermediate variable e are calculated using predetermined constants. However, these predetermined constants may also be variables. That is, variables corresponding to types of watched objects may be stored beforehand using an input device such as the keyboard 5, and a user may make a selection from plural types of variables using an input device such as the mouse 6. Furthermore, the variable may be calculated by CPU according to a mean value or variance of the voxel values, or the result of a region extraction process or the like. As a result, the synthesis ratio is determined more dynamically.

In the third embodiment, the mask generating process sets the mask region M1 by whether or not the second voxel value D2$n$ exceeds the predetermined second threshold T2. However, the predetermined second threshold T2 may also be a variable. That is, second thresholds T2 corresponding to types of watched objects may be stored beforehand in plural types using an input device such as the keyboard 5, and a user may make a selection from the plural types of second thresholds T2 using an input device such as the mouse 6.

In the third embodiment, the fusing process is executed after the mask generating process. However, the mask generating process may also be executed after the fusing process. As a result, for example, after viewing the fusion image P3 once, a desired region may be set as the mask region M1, and the masked region M1 may be changed.

In the third embodiment, the mask generating process sets the mask region M1 in accordance with whether or not the second voxel value D2$n$ exceeds the predetermined second threshold T2. However, the mask region M1 may also be set depending on whether or not the first voxel value D1$n$ and second voxel value D2$n$ exceed respective predetermined thresholds.

Figure 22:
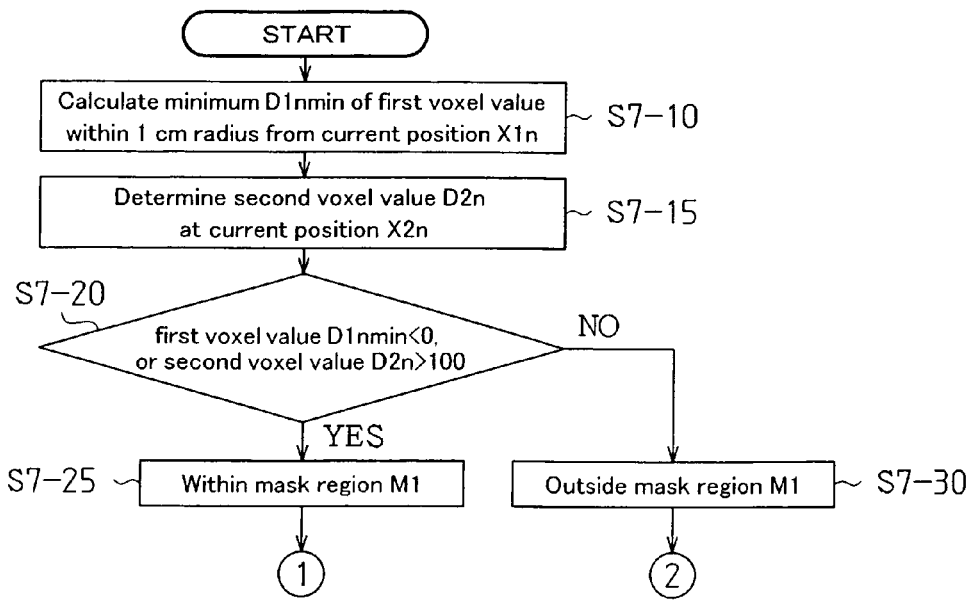
FIG. 22 is a flowchart illustrating another example of the mask generating process of the present invention.

Specifically, in the mask generating process shown in FIG. 22, the CPU 7 calculates a minimum voxel value D1min of a voxel within a radius of 1 cm from the current position X1$n$, and stores the value in the memory section 8a (step S7-10).

Then, the CPU 7 calculates the second voxel value D2$n$ at the current position X2$n$ and stores it in the memory section 8a (step S7-15). Next, the CPU 7 reads the minimum value D1min and the second voxel value D2$n$ from the memory section 8a and determines whether or not the minimum value D1min is less than "0" or whether or not the second voxel value D2$n$ is greater than "100" (step S7-20). When either one of the conditions is satisfied (step S7-20:YES), the CPU 7 sets the current positions X1$n$ and X2$n$ within the mask region M1 (step S7-25). When neither condition is satisfied (step S7-20: NO), however, the CPU 7 sets the current positions X1$n$ and X2$n$ outside the mask region M1 (step S7-30).

As a result, for example, this is useful when watching a tumor developing in a lung. The air filled lung and the tumor in the substantial tissue can both be observed at once.

In the fourth embodiment, network distributed processing is performed by workstations WS1 and WS2 connected to the network. Such processing may also be performed by distributed processing by a plurality of processors installed in a single computer.

The fourth embodiment has been described in terms of an example of distributed processing of the image fusion process when a plurality of virtual rays R are divided, and when only the post processing is divided. When each line (scan line of the monitor 4) of the fusion image P1 (P2, P3) is rendered, the fusion image process may be distributed for each line.

In each of the above embodiments, the partially reflected light Fn is calculated using the synthesis opacity α3n, synthesis color γ3n, and shading coefficient β3n (or a predetermined shading coefficient). The partially reflected light Fn may also be calculated using only the synthesis opacity α3n and synthesis color γ3n without using the shading coefficient β3n (or predetermined shading coefficient).

In the above embodiments, the synthesis ratio CR (first synthesis ratio a, second synthesis ratio b, third synthesis ratio c) is determined for each sampling position (current positions X1n, X2n). However, the synthesis ratio CR may also be determined for a predetermined number of sampling positions, or for sampling positions where an important change in the voxel value or the like is observed. As a result, there are fewer calculations needed in the fusing process, and the real time display of the fusion image P1 (P2, P3) is more readily ensured since the time required to display the fusion image P1 (P2, P3) is reduced.

Although the fusion process ends when the current position X1n or current position X2n reaches an end point in the above embodiments, the fusion process may also end when the attenuation light An becomes "0" even if the current position X1n or current position X2n does not reach an end point. As a result, fewer calculations are required in the fusion process, and the time needed to display the fusion image P1 (P2, P3) in real time is reduced since the sampling does not continue to an end point regardless of whether or not the attenuation light An is "0" and the reflected light En is self-evident.

In the above embodiments, the image processing is performed using optical parameters derived from voxel values. However, the optical parameters may be any parameters insofar as they are values derived from voxel values, and need not be related to physical optical characteristics. The optical parameter may be an abstract value. For example, the optical parameter may be set to "1" when voxel values are within a range of values from 500 to 1000, and "0" when the optical parameter is outside that range. Furthermore, the optical parameter may also be voxel value itself.

In the above embodiments, a fusion image is generated by performing the image fusion process on CT image data DT1 and PET image data DT2. However, the image fusion process may also be performed using MRI image data and MRA image data and the like other than the CT image data DT1 and PET image data DT2. Furthermore the image data subjected to the image fusion process is not limited to two types of data, and image data obtained by three or more modalities may be used to generate the fusion image.

In the above embodiments, a fusion image P1 (P2, P3) is generated by performing the image fusion process on CT image data DT1 and PET image data DT2. However, image data projected by the same modality among any of the above image data is also possible. For example, beneficial information for diagnosis may be obtained by fusing image data having different imaging conditions and different contrasting conditions. A plurality of image data may be generated by reproducing identical image data two times or more, filtering the data with different filters, and fusing the plural pieces of generated image data.

In the above embodiments, volume rendering is accomplished by the ray casting method. However, different volume rendering methods may be used instead of ray casting, such as maximum intensity projection, minimum intensity projection, mean value method, Raysum method and the like.

In the above embodiments, the image fusing process is performed on three-dimensional image data. However, the image fusing process may also be performed on image data of four or more dimensions.

In the above embodiments, the image fusing process is performed on a CT image and PET image of part of a human body, such as bone or internal organ or the like. However, the present invention is not particularly limited to the living tissue of humans, animals, or plants inasmuch as the present invention is also applicable to image processing of electrical circuit patterns, structural materials of machinery and devices, metallurgical examinations, geologic examinations, LSI diagnosis, and the like.

In the above embodiments, the image fusing process is performed on a CT image and PET image of part of a human body, such as bone or internal organ or the like. However, the present invention is also applicable to results of scientific calculations and computer aided engineering systems.

The present examples and embodiments are to be considered as illustrative and not restrictive, and the invention is not to be limited to the details given herein, but may be modified within the scope and equivalence of the appended claims.

What is claimed is:

1. A method for generating a fusion image by fusing plural pieces of image data for three or more dimensions obtained from a single watched object through individual processing or distributed processing executed by at least one computer, the method comprising the steps of:

associating the plural pieces of image data for three or more dimensions with one another based on positional relationship and projecting a plurality of virtual rays for each of the plural pieces of image data for three or more dimensions, wherein the plural pieces of image data for three or more dimensions each includes optical parameters for sampling positions on the corresponding plurality of virtual rays;

determining a synthesis ratio at least twice for synthesizing the optical parameters of the plural pieces of image data for three or more dimensions with one another on each of the virtual rays;

calculating a synthesized optical parameter for each of the sampling positions by synthesizing the optical parameters of the plural pieces of image data for three or more dimensions based on the synthesis ratio;

calculating partially reflected light at each of the sampling positions based on the synthesized optical parameter; and calculating a pixel value of the fusion image by accumulating the partially reflected light, wherein:

the optical parameters include color information and opacity information; and the step of determining a synthesis ratio includes:

determining a color synthesis ratio at least twice for synthesizing the color information on each of the virtual rays; and determining an opacity synthesis ratio at least twice for synthesizing the opacity information on each of the virtual rays;

the step of calculating a synthesized optical parameter includes:

calculating synthesis color information based on the color synthesis ratio; and calculating synthesis opacity information based on the opacity synthesis ratio wherein the above steps are executed by at least one computer.

2. The method according to claim 1, wherein:

the step of determining a synthesis ratio further includes determining a shading synthesis ratio at least twice for synthesizing shading coefficients on each of the virtual rays;

the step of calculating a synthesized optical parameter further includes calculating a synthesis shading coefficient based on the shading synthesis ratio; and the step of calculating partially reflected light includes calculating partially reflected light for each of the sampling positions based on the synthesis color information, synthesis opacity information, and synthesis shading coefficient.

3. The method according to claim 1, wherein:

the plural pieces of image data for three or more dimensions each includes a voxel value;

the step of determining a synthesis ratio further includes:

comparing a first threshold with a voxel value for a sampling position on a virtual ray projected for at least one of the image data of three or more dimensions; and determining the synthesis ratio in accordance with the comparison of the first threshold and the voxel value.

4. The method according to claim 1, wherein the plural pieces of image data for three or more dimensions each includes a voxel value, the method further comprising the steps of:

comparing a second threshold with a voxel value for a sampling position on a virtual ray projected for at least one of the image data of three or more dimensions; and generating a mask region in accordance with the comparison of the second threshold and the voxel value.

5. The method according to claim 1, wherein the step of determining a synthesis ratio includes determining the synthesis ratio in multiple-stage.

6. The method according to claim 1, wherein the step of determining the synthesis ratio includes setting the synthesis ratio in accordance with the gradient of the sampling positions.

7. The method according to claim 1, wherein the step of calculating the synthesized optical parameter includes calculating a plurality of synthesized optical parameters by synthesizing the optical parameters of the plural pieces of image data for three or more dimensions with different synthesis ratios, the method further comprising the step of:

preparing an animation using a plurality of fusion images generated with the plurality of synthesized optical parameters.

8. A computer program device incorporating a computer readable medium encoded with a program for generating a fusion image by fusing plural pieces of image data for three or more dimensions obtained from a single watched object through individual processing or distributed processing executed by at least one computer, the program when executed by the at least one computer causing the at least one computer to perform the steps comprising:

associating the plural pieces of image data for three or more dimensions with one another based on positional relationship and projecting a plurality of virtual rays for each of the plural pieces of image data for three or more dimensions, wherein the plural pieces of image data for three or more dimensions each includes optical parameters for sampling positions on the corresponding plurality of virtual rays;

determining a synthesis ratio at least twice for synthesizing the optical parameters of the plural pieces of image data for three or more dimensions with one another on each of the virtual rays;

calculating a synthesized optical parameter for each of the sampling positions by synthesizing the optical parameters of the plural pieces of image data for three or more dimensions based on the synthesis ratio;

calculating partially reflected light at each of the sampling positions based on the synthesized optical parameter; and calculating a pixel value of the fusion image by accumulating the partially reflected light, wherein:

the optical parameters include color information and opacity information; and the step of determining a synthesis ratio includes:

determining a color synthesis ratio at least twice for synthesizing the color information on each of the virtual rays; and determining an opacity synthesis ratio at least twice for synthesizing the opacity information on each of the virtual rays;

the step of calculating a synthesized optical parameter includes:

calculating synthesis color information based on the color synthesis ratio; and calculating synthesis opacity information based on the opacity synthesis ratio.

9. The computer program device according to claim 8, wherein:

the step of determining a synthesis ratio further includes determining a shading synthesis ratio at least twice for synthesizing shading coefficients on each of the virtual rays;

the step of calculating a synthesized optical parameter further includes calculating a synthesis shading coefficient based on the shading synthesis ratio; and the step of calculating partially reflected light includes calculating partially reflected light for each of the sampling positions based on the synthesis color information, synthesis opacity information, and synthesis shading coefficient.

10. The computer program device according to claim 8, wherein:

the plural pieces of image data for three or more dimensions each includes a voxel value;

the step of determining a synthesis ratio further includes:

comparing a first threshold with a voxel value for a sampling position on a virtual ray projected for at least one of the image data of three or more dimensions; and determining the synthesis ratio in accordance with the comparison of the first threshold and the voxel value.

11. The computer program device according to claim 8, wherein the plural pieces of image data for three or more dimensions each includes a voxel value, the program causes the at least one computer to further perform the steps comprising:

comparing a second threshold with a voxel value for a sampling position on a virtual ray projected for at least one of the image data of three or more dimensions; and generating a mask region in accordance with the comparison of the second threshold and the voxel value.

12. The computer program device according to claim 8, wherein the step of determining a synthesis ratio includes determining the synthesis ratio in multiple-stage.

13. The computer program device according to claim 8, wherein the step of determining the synthesis ratio includes setting the synthesis ratio in accordance with the gradient of the sampling position.

14. The computer program device according to claim 8, wherein the step of calculating the synthesized optical parameter includes calculating a plurality of synthesized optical parameters by synthesizing the optical parameters of the plural pieces of image data for three or more dimensions with different synthesis ratios, the program causes the at least one computer to further perform the step comprising:

preparing an animation using a plurality of fusion images generated with the plurality of synthesized optical parameters.

15. An apparatus for generating a fusion image by fusing plural pieces of image data for three or more dimensions obtained from a single watched object through individual processing or distributed processing executed by at least one computer, the apparatus comprising:

means for associating the plural pieces of image data for three or more dimensions with one another based on positional relationship and projecting a plurality of virtual rays for each of the plural pieces of image data for three or more dimensions, wherein the plural pieces of image data for three or more dimensions each includes optical parameters for sampling positions on the corresponding plurality of virtual rays;

means for determining a synthesis ratio at least twice for synthesizing the optical parameters of the plural pieces of image data for three or more dimensions with one another on each of the virtual rays;

means for calculating a synthesized optical parameter for each of the sampling positions by synthesizing the optical parameters of the plural pieces of image data for three or more dimensions based on the synthesis ratio;

means for calculating partially reflected light at each of the sampling positions based on the synthesized optical parameter; and means for calculating a pixel value of the fusion image by accumulating the partially reflected light, wherein:

the optical parameters include color information and opacity information; and the means for determining a synthesis ratio includes:

means for determining a color synthesis ratio at least twice for synthesizing the color information on each of the virtual rays; and means for determining an opacity synthesis ratio at least twice for synthesizing the opacity information on each of the virtual rays;

the means for calculating a synthesized optical parameter includes:

means for calculating synthesis color information based on the color synthesis ratio; and means for calculating synthesis opacity information based on the opacity synthesis ratio.

16. The apparatus according to claim 15, wherein:

the means for determining a synthesis ratio further includes a means for determining a shading synthesis ratio at least twice for synthesizing shading coefficients on each of the virtual rays;

the means for calculating a synthesized optical parameter further includes a means for calculating a synthesis shading coefficient based on the shading synthesis ratio; and the means for calculating partially reflected light includes calculating partially reflected light for each of the sampling positions based on the synthesis color information, synthesis opacity information, and synthesis shading coefficient.

17. The apparatus according to claim 15, wherein the means for determining a synthesis ratio, means for calculating a synthesis optical parameter, means for calculating partially reflected light, and means for calculating pixel values are partially or entirely a graphics processing unit.

18. The apparatus according to claim 15, wherein the graphics processing unit executes post processing to convert the calculated pixel value to a format enabling output to an output device.

* * * * *